US010907022B2

(12) United States Patent
Treat et al.

(10) Patent No.: US 10,907,022 B2
(45) Date of Patent: Feb. 2, 2021

(54) CONTROLLED POLYMER FOAMING BY TUNING SURFACE INTERACTIONS BETWEEN BLOWING AGENTS AND MINERALS

(71) Applicant: Imerys Filtration Minerals, Inc., San Jose, CA (US)

(72) Inventors: Neil Treat, San Jose, CA (US); Jie Lu, San Jose, CA (US); Caroline Abler, Roquettes (FR)

(73) Assignee: Imerys USA, Inc., Roswell, GA (US)

( * ) Notice: Subject to any disclaimer, the term of this patent is extended or adjusted under 35 U.S.C. 154(b) by 362 days.

(21) Appl. No.: 15/735,620

(22) PCT Filed: Oct. 3, 2016

(86) PCT No.: PCT/US2016/055175
§ 371 (c)(1),
(2) Date: Dec. 12, 2017

(87) PCT Pub. No.: WO2017/059430
PCT Pub. Date: Apr. 6, 2017

(65) Prior Publication Data
US 2020/0048423 A1    Feb. 13, 2020

Related U.S. Application Data

(60) Provisional application No. 62/236,300, filed on Oct. 2, 2015.

(30) Foreign Application Priority Data

Nov. 3, 2015 (EP) .................................. 15290282

(51) Int. Cl.
*C08J 9/00* (2006.01)
*C08J 9/12* (2006.01)
*C08K 3/34* (2006.01)

(52) U.S. Cl.
CPC ............. *C08J 9/0066* (2013.01); *C08J 9/122* (2013.01); *C08K 3/34* (2013.01);
(Continued)

(58) Field of Classification Search
CPC ........................................................ C08J 9/0066
See application file for complete search history.

(56) References Cited

U.S. PATENT DOCUMENTS

| 4,394,460 A | 7/1983 | Chung et al. |
| 6,348,536 B1 | 2/2002 | Fourty et al. |
| (Continued) | | |

FOREIGN PATENT DOCUMENTS

| JP | S 5493698 A | 7/1979 |
| JP | S 62106937 A | 5/1987 |
| (Continued) | | |

OTHER PUBLICATIONS

Machine Translation of JP 04292641 A (Year: 2020).*
(Continued)

*Primary Examiner* — Michael M Dollinger
(74) *Attorney, Agent, or Firm* — Finnegan, Henderson, Farabow, Garrett & Dunner, LLP

(57) ABSTRACT

A method of producing a polymer foam may include providing a polymer composition, introducing an alkaline earth metal silicate into the polymer composition, and foaming the polymer composition using a gas to form a polymer foam. A method of producing a polymer-matrix may include providing a polymer composition, nucleating the polymer composition with an alkaline earth metal silicate, and using a blowing agent to form a polymer foam from the polymer composition. The alkaline earth metal silicate may facilitate nucleation of the cells in the polymer foam. A polymer foam
(Continued)

composition may include a polymer-based foam matrix and an alkaline earth metal silicate within a cell of the polymer-based foam matrix.

14 Claims, 7 Drawing Sheets

(52) U.S. Cl.
CPC ...... *C08J 2205/044* (2013.01); *C08J 2323/08* (2013.01); *C08J 2331/04* (2013.01); *C08J 2367/02* (2013.01); *C08J 2375/04* (2013.01); *C08K 2201/005* (2013.01); *C08K 2201/006* (2013.01)

(56) References Cited

U.S. PATENT DOCUMENTS

| | | |
|---|---|---|
| 2003/0051841 A1* | 3/2003 | Mathur ............... C01B 33/24 162/181.1 |
| 2004/0229968 A1 | 11/2004 | Dontula et al. |
| 2006/0264523 A1 | 11/2006 | Lee et al. |
| 2007/0269647 A1 | 11/2007 | Wu et al. |
| 2008/0305027 A1 | 12/2008 | Johnston et al. |
| 2009/0036392 A1* | 2/2009 | Lennernas ........... A61K 9/1611 514/44 R |
| 2012/0045603 A1 | 2/2012 | Zerafati et al. |
| 2013/0203878 A1 | 8/2013 | Igualada et al. |
| 2015/0051303 A1 | 2/2015 | Glew et al. |
| 2015/0175762 A1 | 6/2015 | Meli |

FOREIGN PATENT DOCUMENTS

| | | |
|---|---|---|
| JP | 04292641 A  * | 10/1992 |
| JP | 2002-146079 A | 5/2002 |
| JP | 2012525472 | 10/2012 |
| JP | 2015521677 | 7/2015 |
| JP | 2016500396 | 1/2016 |
| JP | 2016509109 | 3/2016 |
| WO | WO 00/14150 | 3/2000 |
| WO | WO 2003/104311 A1 | 12/2003 |
| WO | WO 2010/126773 A1 | 11/2010 |
| WO | WO 2012/010481 A1 | 1/2012 |
| WO | WO 2014/001158 A1 | 1/2014 |
| WO | WO 2014/078343 A1 | 5/2014 |
| WO | WO 2014/128072 | 8/2014 |
| WO | WO 2015/158897 A1 | 10/2015 |
| WO | WO 2014/099721 | 6/2016 |

OTHER PUBLICATIONS

THERMO-1200 Data Sheet. Johns Manville. IND-303 Oct. 16, 2019. (Year: 2019).*
International Search Report and Written Opinion dated Dec. 23, 2016, in International Application No. PCT/US2016/055175 (12 pgs.).
EPO Communication pursuant to Rule 62 EPC for related Application No. 16852828.9-1107 / 3356454 with extended European search report, dated Mar. 6, 2019.

* cited by examiner

CONTROLLED POLYMER FOAMING BY TUNING SURFACE INTERACTIONS BETWEEN BLOWING AGENTS AND MINERALS

CLAIM FOR PRIORITY

This application is a U.S. national phase entry of International Application No. PCT/US2016/055175, filed Oct. 3, 2016 which claims the benefit of priority of U.S. Provisional Patent Application No. 62/236,300, filed Oct. 2, 2015, and European Patent Application No. EP 15290282.1, filed Nov. 3, 2015, to each of which this application claims the benefit of priority, and the entirety of the subject matter each of which is incorporated herein by reference.

FIELD OF THE DISCLOSURE

The present disclosure relates to polymer-based foams having improved cellular structure and using at least one alkaline earth metal silicate as a nucleating agent. The disclosure further relates to methods of providing polymer-based foams using at least one alkaline earth metal silicate as a nucleating agent.

BACKGROUND

Lightweight components formed from lightweight polymer materials are used in many applications, such as food packaging and the automotive industry. One of the main challenges involving lightweight polymer materials lies in the development of increasingly light components, but retaining the mechanical properties of heavier components. A possible strategy for developing lightweight components may include foaming of a base material to reduce the weight or density. Foaming may include incorporating reinforcing and/or functional fillers into the foam to act as cell nucleating agents or promoters. Cell nucleating agents can be used in polymeric foaming processes to enhance cell nucleation. With the presence of nucleating agents, heterogeneous nucleation becomes the predominant mode of cell nucleation during polymer foaming processes.

Polypropylene foams are known, but they have reduced stiffness and mechanical strength compared to conventional polypropylene, and present foaming processes may be insufficient to decrease the weight while retaining desirable mechanical properties. Increasing oil prices have also contributed to increased production costs of plastic resins and finished plastic products. Plastic resin costs typically amount to 50% to 60% of the total cost of any given plastic product; therefore, a reduction of resin amounts in plastics while at the same time maintaining mechanical and other properties of the plastic products could provide considerable economic benefit.

A polymer foam can be described as a material with a cellular structure created by the formation of gas bubbles within a polymer. Polymer foams may offer certain advantages over their solid analogues, including lower density, higher thermal insulation, enhanced sound deadening, and tunable mechanical properties. In closed-cell polymer foams, the size and distribution of the foam cells may have an impact on the resulting physical properties. For example, foams with cell sizes smaller than the critical defect size of the polymer may limit fracture and may reduce the weight without sacrificing the mechanical properties. Therefore, developing straight-forward strategies to control the size and distribution of cells within a polymer foam would be desirable.

Accordingly, it may be desirable to provide a polymer-based foam having improved properties. It may also be desirable to provide a method of producing a polymer-based foam.

SUMMARY

According to one aspect of this disclosure, a method of producing a polymer foam may include providing a polymer composition, introducing an alkaline earth metal silicate into the polymer composition, and foaming the polymer composition using a gas to form a polymer foam.

According to another aspect, a method of producing a polymer-matrix may include providing a polymer composition, nucleating the polymer composition with an alkaline earth metal silicate, and using a blowing agent to form a polymer foam from the polymer composition. The alkaline earth metal silicate may facilitate nucleation of the cells in the polymer foam.

According to a further aspect, introducing the alkaline earth metal silicate may include introducing the alkaline earth metal silicate into the polymer composition using an extrusion-mixing process.

According to still another aspect, the polymer composition may include at least one of a thermoplastic polymer or a thermoplastic elastomer. In another aspect, the polymer composition may include at least polymer selected from the group consisting of a polyolefin, a polyamide, a polycarbonate, a polyimide, a polyurethane, a polyethylenemine, a polyoxymethylene, a polyester, a polyacrylate, and copolymers and blends thereof. In another aspect, the polymer composition may include at least polymer selected from the group consisting of a polystyrene, a polyethylene, a polypropylene, a polystyrene, a polyamide, a polyurethane, a poly(ethyl vinyl acetate), a polyethylene terephthalate, and copolymers and blends thereof.

According to still another aspect, the polymer composition may include at least one of a thermoplastic polymer or a thermoplastic elastomer. For example, the polymer composition may include at least one of polystyrene, polyethylene, polyamide, polypropylene, polyurethane, poly(ethyl vinyl acetate) (EVA), polyethylene terephthalate (PET), or copolymers thereof. According to another aspect, the polymer composition may include a thermoset polymer, such as, for example, a polyester or a urea-formaldehyde polymer. According to a further aspect, the polymer composition may include a polyolefin.

According to another aspect, the blowing agent may include at least one of $CO_2$, $N_2$, or an organic gas. An organic gas may include, for example, hexane, propane, butane, n-butane, i-butane, pentane, i-pentane, n-pentane, $CHF_2Cl$, $CF_2ClCH_3$, $CHF_2CH_3$, $CHCl_2CF_3$, $CHFClCF_2Cl$, $CHFClCF_3$, $CH_2FCF_3$, $CH_3CF_3$, $CFCl_3$, $CF_2Cl_2$, $CFCl_2CF_2Cl$, $CF_2ClCF_2Cl$, $CH_3Cl$, or $CH_2Cl_2$.

According to still another aspect, the polymer composition may be the major component of the polymer foam. For example, the polymer composition may be present in an amount greater than about 50% by weight of the polymer foam, greater than about 55%, greater than about 60%, greater than about 65%, greater than about 70%, greater than about 75%, greater than about 80%, greater than about 85%, greater than about 90%, greater than about 92%, greater than about 95%, greater than about 96%, greater than about 97%, greater than about 98%, greater than about 98.5%, greater than about 99%, greater than about 99.5%, or greater than about 99.7% by weight of the polymer foam.

According to another aspect, the alkaline earth metal silicate or nucleating agent may be present in an amount in a range from about 1% by weight to about 30% by weight of the polymer foam, such as, for example, in a range from about 5% by weight to about 20% by weight, from about 5% by weight to about 15% by weight, from about 10% by weight to about 20% by weight, from about 15% by weight to about 25% by weight, or from about 20% by weight to about 25% by weight of the polymer foam.

According to another aspect, the alkaline earth metal silicate may include at least one of calcium silicate, magnesium silicate, beryllium silicate, strontium silicate, or barium silicate. In another aspect, the calcium silicate may include a synthetic calcium silicate. In another aspect, the calcium silicate may comprise a natural calcium silicate, such as, for example, a Wollastonite. According to another aspect, the alkaline earth metal silicate may include a derived calcium silicate, such as, for example, diatomaceous earth-derived calcium silicate. According to another aspect, the alkaline earth metal silicate may include a blend of alkaline earth metal silicates. According to another aspect, the alkaline earth metal silicate may include a secondary mineral in addition to the alkaline earth metal silicate.

According to another aspect, the alkaline earth metal silicate may include magnesium oxysulfate as a secondary mineral. In one aspect, the magnesium oxysulfate may have an aspect ratio ranging from about 1 to about 50, such as, for example, from about 1 to about 40, or from about 10 to about 40. In another aspect, the alkaline earth metal silicate may include a secondary mineral selected from a kaolin, a bentonite, a talc, a chloritic talc, a milled expanded perlite, and a diatomaceous earth.

According to another aspect, the alkaline earth metal silicate may include a functionalized alkaline earth metal silicate. The functionalized alkaline earth metal silicate may have a surface treatment that may enhance interaction with one or more of the gas or the polymer composition. For example, the surface treatment may impart hydrophobic properties to the alkaline earth metal silicate. According to another aspect, the surface treatment may include a silane, silicone oil, siloxane, fatty acid, salt thereof, or ester thereof. According to another aspect, the fatty acid, salt thereof, or ester thereof may have a chain length of C8 or higher. According to another aspect, the alkaline earth metal silicate may include a secondary mineral in addition to the alkaline earth metal silicate.

According to another aspect, the alkaline earth metal silicate may include magnesium oxysulfate as a secondary mineral. In one aspect, the magnesium oxysulfate can have an aspect ratio ranging from about 1 to about 50, such as, for example, from about 1 to about 40, or from about 10 to about 40. In another aspect, the alkaline earth metal silicate may include a secondary mineral selected from a kaolin, a bentonite, a talc, a chloritic talc, a milled expanded perlite, and a diatomaceous earth. According to another aspect, talc or chloritic talc may include at least one of a lamellar talc, micro-lamellar talc, microcrystalline talc, and macrocrystalline talc.

According to another aspect, the mineral nucleating agent, such as, for example, an alkaline earth metal silicate, may have a high aspect ratio.

According to yet a further aspect, the talc or chloritic talc may include one or more of a high aspect ratio talc, a high aspect ratio lamellear talc, a high aspect ratio micro-lamellar talc, a high aspect ratio chloritic talc, a high aspect ratio lamellar chloritic talc, and a high aspect ratio micro-lamellar chloritic talc.

According to another aspect, a high aspect ratio of the mineral nucleating agent may be achieved by a wet-milling process.

According to still another aspect, the mineral nucleating agent may include a blend of a talc and a chloritic talc. For example, the mineral nucleating agent may include talc as a mineral and chloritic talc as a secondary mineral, or may include chloritic talc as a mineral and talc as a secondary mineral.

According to a further aspect, the polymer foam composition may have a flexural modulus greater than or equal to about 1000 MPa, such as, for example, greater than or equal to about 1300 MPa, greater than or equal to about 1500 MPa, greater than or equal to about 1700 MPa, greater than or equal to about 2000 MPa, greater than or equal to about 2100 MPa, greater than or equal to about 2300 MPa, or greater than or equal to about 2500 MPa.

According to another aspect, the polymer foam composition may have a flexural modulus in a range from about 1000 MPa to about 3000 MPa, such as, for example, in a range from about 1300 MPa to about 2800 MPa, from about 1500 MPa to about 2300 MPa, or from about 2000 MPa to about 2600 MPa.

According to another aspect, the polymer foam composition may have a first flexural modulus. The first flexural modulus may be greater than a flexural modulus of a comparative polymer foam composition having a mineral nucleating agent that includes one of the mineral and the secondary mineral individually.

According to another aspect, the polymer foam composition having a mineral nucleating agent and a secondary mineral nucleating agent may have an impact resistance that is not adversely affected relative to a polymer foam composition having a mineral nucleating agent that includes one of the mineral and the secondary mineral individually.

According to yet a further aspect, the polymer foam composition may have a weight reduction greater than or equal to about 5% as compared to the same volume of the non-foamed polymer, such as, for example, greater than or equal to about 10%, greater than or equal to about 15%, or greater than or equal to about 20% as compared to the same volume of the non-foamed polymer.

According to still another aspect, the polymer foam composition may have a weight reduction in a range from about 5% to about 30% as compared to the same volume of the non-foamed polymer.

According to another aspect, the mineral nucleating agent may have a lamellarity index greater than about 2.8, such as, for example, greater than or equal to about 3.0, greater than or equal to about 3.5, or greater than or equal to about 4.0.

According to still another aspect, the polymer foam may have an average cell size ($\varphi$) less than or equal to about 450 µm. For example, the polymer foam may have an average cell size ($\varphi$) less than or equal to about 400 µm, less than or equal to about 350 µm, less than or equal to about 300 µm, less than or equal to about 250 µm, less than or equal to about 200 µm, less than or equal to about 150 µm, less than or equal to about 100 µm, less than or equal to about 50 µm, less than or equal to about 25 µm, or less than or equal to about 20 µm.

According to still another aspect, the polymer foam may have an average cell size ($\varphi$) in a range from about 10 µm to about 450 µm. For example, the polymer foam may have an average cell size ($\varphi$) in a range from about 100 µm to about 400 μm, from about 100 μm to about 300 μm, from about 50 μm to about 250 μm, from about 10 μm to about 100 μm, from about 200 μm to about 400 μm, from about 200 μm to about 300 μm, from about 100 μm to about 150 μm, from about 10 μm to about 50 μm, from about 10 μm to about 30 μm, or from about 50 μm to about 100 μm.

According to another aspect, the polymer foam may have an average cell size (φ) less than the critical defect size of the polymer composition.

According to a further aspect, the polymer foam may have a cell density ($N_f$) greater than or equal to about $3.0 \times 10^7$ per cm$^3$. For example, the polymer foam may have a cell density ($N_f$) greater than or equal to about $5.0 \times 10^7$ per cm$^3$, greater than or equal to about $7.0 \times 10^7$ per cm$^3$, greater than or equal to about $8.0 \times 10^8$ per cm$^3$, greater than or equal to about $9.0 \times 10^7$ per cm$^3$, greater than or equal to about $1.0 \times 10^8$ per cm$^3$, greater than or equal to about $1.3 \times 10^8$ per cm$^3$, greater than or equal to about $1.5 \times 10^8$ per cm$^3$, greater than or equal to about $1.8 \times 10^8$ per cm$^3$, greater than or equal to about $2.0 \times 10^8$ per cm$^3$, greater than or equal to about $2.3 \times 10^8$ per cm$^3$, greater than or equal to about $2.5 \times 10^8$ per cm$^3$, greater than or equal to about $2.8 \times 10^8$ per cm$^3$, or greater than or equal to about $3.0 \times 10^8$ per cm$^3$.

According to a further aspect, the polymer foam may have a cell density ($N_f$) in a range from about $3.0 \times 10^7$ per cm$^3$ to about $4.0 \times 10^8$ per cm$^3$. For example, the polymer foam may have a cell density ($N_f$) in a range from about $5.0 \times 10^7$ per cm$^3$ to about $3.0 \times 10^8$ per cm$^3$, from about $7.0 \times 10^7$ per cm$^3$ to about $3.0 \times 10^8$ per cm$^3$, from about $1.0 \times 10^8$ per cm$^3$ to about $3.0 \times 10^8$ per cm$^3$, from about $1.0 \times 10^8$ per cm$^3$ to about $2.0 \times 10^8$ per cm$^3$, from about $2.0 \times 10^8$ per cm$^3$ to about $3.0 \times 10^8$ per cm$^3$, from about $3.0 \times 10^8$ per cm$^3$ to about $4.0 \times 10^8$ per cm$^3$, from about $1.5 \times 10^8$ per cm$^3$ to about $2.5 \times 10^8$ per cm$^3$, from about $5.0 \times 10^7$ per cm$^3$ to about $1.0 \times 10^8$ per cm$^3$, or from about $7.0 \times 10^7$ per cm$^3$ to about $1.0 \times 10^8$ per cm$^3$.

According to another aspect, the alkaline earth metal silicate may have a BET surface area greater than or equal to about 3.0 m$^2$/g. For example, the alkaline earth metal silicate may have a BET surface area greater than or equal to about 10 m$^2$/g, greater than or equal to about 50 m$^2$/g, greater than or equal to about 75 m$^2$/g, greater than or equal to about 90 m$^2$/g, greater than or equal to about 100 m$^2$/g, greater than or equal to about 150 m$^2$/g, greater than or equal to about 200 m$^2$/g, greater than or equal to about 250 m$^2$/g, or greater than or equal to about 300 m$^2$/g.

According to another aspect, the alkaline earth metal silicate may have a BET surface area in a range from about 3.0 m$^2$/g to about 300 m$^2$/g. For example, the alkaline earth metal silicate may have a BET surface area in a range from about 3 m$^2$/g to about 30 m$^2$/g, from about 10 m$^2$/g to about 100 m$^2$/g, from about 100 m$^2$/g to about 300 m$^2$/g, from about 50 m$^2$/g to about 150 m$^2$/g, from about 10 m$^2$/g to about 50 m$^2$/g, from about 3 m$^2$/g to about 25 m$^2$/g, from about 150 m$^2$/g to about 250 m$^2$/g, from about 200 m$^2$/g to about 300 m$^2$/g, or from about 100 m$^2$/g to about 200 m$^2$/g.

According to still another aspect, the alkaline earth metal silicate may have a median particle size ($d_{50}$) greater than or equal to about 1 μm, such as, for example, greater than or equal to about 3 μm, greater than or equal to about 5 μm, greater than or equal to about 7 μm, greater than or equal to about 9 μm, greater than or equal to about 10 μm, greater than or equal to about 11 μm, greater than or equal to about 12 μm, greater than or equal to about 13 μm, greater than or equal to about 14 μm, or greater than or equal to about 15 μm.

According to still another aspect, the alkaline earth metal silicate may have a median particle size ($d_{50}$) in a range from about 1 μm to about 15 μm, such as, for example, from about 1 μm to about 5 μm, from about 5 μm to about 10 μm, from about 10 μm to about 15 μm, from about 1 μm to about 3 μm, from about 3 μm to about 6 μm, from about 6 μm to about 9 μm, from about 9 μm to about 12 μm, or from about 12 μm to about 15 μm.

According to another aspect, the method may include a two-step extrusion-mixing and foaming process. According to still another aspect, the method may include a single-step injection-moulding foaming process.

According to yet another aspect, the alkaline earth metal silicate may have an oil absorption greater than or equal to about 300 wt %, such as, for example, greater than or equal to about 320 wt %, greater than or equal to about 350 wt %, greater than or equal to about 370 wt %, greater than or equal to about 400 wt %, greater than or equal to about 420 wt %, or greater than or equal to about 450 wt %.

According to yet another aspect, the alkaline earth metal silicate may have a water absorption greater than or equal to about 400 wt %, such as, for example, greater than or equal to about 420 wt %, greater than or equal to about 450 wt %, greater than or equal to about 470 wt %, greater than or equal to about 500 wt %, greater than or equal to about 520 wt %, greater than or equal to about 550 wt %, or greater than or equal to about 570 wt %.

According to still another aspect, the alkaline earth metal silicate may have an aspect ratio in the range of from about 1 to about 50, such as, for example, from about 1 to about 25, from about 1.5 to about 20, from about 2 to about 10, from about 10 to about 40, or from about 20 to about 40.

According to another aspect, the alkaline earth metal silicate may have a basic pH. For example, the alkaline earth metal silicate may have a pH greater than 7, greater than or equal to about 8, greater than or equal to about 9, or greater than or equal to about 10.

According to another aspect, the polymer foam may have a relative density compared to the respective unfoamed base materials, in a range from about 0.20 to 0.90, such as, for example, in a range from about 0.25 to about 0.40, from about 0.40 to about 0.60, from about 0.60 to about 0.80, from about 0.25 to about 0.35, from about 0.35 to about 0.50, from about 0.50 to about 0.75, or from about 0.60 to about 0.75

According to another aspect, a polymer foam composition may include a polymer-based foam matrix and a mineral nucleating agent within a cell of the polymer-based foam matrix.

According to another aspect, the mineral nucleating agent may include alkaline earth metal silicate. According to another aspect, the mineral nucleating agent may include at least one of magnesium oxysulfate, kaolin, talc, chloritic talc, perlite, expanded milled perlite, diatomaceous earth, glass cullet, feldspar, nepheline syenite, or bentonite. According to another aspect, talc or chloritic talc may include at least one of a lamellar talc, micro-lamellar talc, microcrystalline talc, and macrocrystalline talc.

In general, the individual platelet size, i.e., the median diameter as measured by the Sedigraph method, of an individual talc platelet (a few thousand elementary sheets) can vary from approximately 1 μm to over 100 μm, depending on the conditions of formation of the deposit. The individual platelet size determines the lamellarity of the talc. A highly lamellar talc will have large individual platelets, whereas a microcrystalline talc will have small platelets. Although all talcs may be termed lamellar, their platelet size differs from one deposit to another. Small crystals provide a compact, dense ore, known as microcrystalline talc. Large crystals come in papery layers, known as macrocrystalline talc. Known microcrystalline talc deposits are located in Montana (Yellowstone) and in Australia (Three Springs). In a microcrystalline structure, talc elementary particles are composed of small plates compared to macrocrystalline structures, which are composed of larger plates.

According to another aspect, the mineral nucleating agent may have a high aspect ratio. According to still another aspect, the talc or chloritic talc may include one or more of a high aspect ratio talc, a high aspect ratio lamellear talc, a high aspect ratio micro-lamellar talc, a high aspect ratio chloritic talc, a high aspect ratio lamellar chloritic talc, and a high aspect ratio micro-lamellar chloritic talc.

According to a further aspect, the polymer-based foam matrix may include at least one of a thermoplastic polymer matrix or a thermoplastic elastomer matrix. According to still another aspect, the polymer-based foam matrix may include at least one of a polyethylene matrix, polystyrene matrix, polypropylene matrix, polyurethane matrix, poly(ethyl vinyl acetate) (EVA) matrix, polyethylene terephthalate (PET) matrix, or copolymer matrices thereof. According to a further aspect, the polymer-based foam matrix may include a polyolefin matrix.

According to another aspect, the blowing agent used to form the polymer-based foam matrix may include at least one of $CO_2$, $N_2$, or an organic gas. An organic gas may include, for example, hexane, propane, butane, n-butane, i-butane, pentane, i-pentane, n-pentane, $CHF_2Cl$, $CF_2ClCH_3$, $CHF_2CH_3$, $CHCl_2CF_3$, $CHFClCF_2Cl$, $CHFClCF_3$, $CH_2FCF_3$, $CH_3CF_3$, $CFCl_3$, $CF_2Cl_2$, $CFCl_2CF_2Cl$, $CF_2ClCF_2Cl$, $CH_3Cl$, or $CH_2Cl_2$.

According to still another aspect, the polymer-based foam matrix may be the major component of the polymer foam composition. For example, the polymer-based foam matrix may be present in an amount greater than about 50% by weight of the polymer foam composition, greater than about 55%, greater than about 60%, greater than about 65%, greater than about 70%, greater than about 75%, greater than about 80%, greater than about 85%, greater than about 90%, greater than about 92%, greater than about 95%, greater than about 96%, greater than about 97%, greater than about 98%, greater than about 98.5%, greater than about 99%, greater than about 99.5%, or greater than about 99.7% by weight of the polymer foam composition.

According to another aspect, the alkaline earth metal silicate or nucleating agent may be present in an amount in a range from about 1% by weight to about 30% by weight of the polymer foam composition, such as, for example, in a range from about 5% by weight to about 20% by weight, from about 5% by weight to about 15% by weight, from about 10% by weight to about 20% by weight, from about 15% by weight to about 25% by weight, or from about 20% by weight to about 25% by weight of the polymer foam composition.

According to still another aspect, the alkaline earth metal silicate may include at least one of calcium silicate, magnesium silicate, beryllium silicate, strontium silicate, or barium silicate. In another aspect, the calcium silicate may include a synthetic calcium silicate. In another aspect, the calcium silicate may include a natural calcium silicate, such as, for example, a Wollastonite. According to some embodiments, the alkaline earth metal silicate may include a derived calcium silicate, such as, for example, diatomaceous earth-derived calcium silicate. According to another aspect, the alkaline earth metal silicate may include a blend of alkaline earth metal silicates.

According to another aspect, the mineral nucleating agent may include a functionalized alkaline earth metal silicate. The functionalized mineral nucleating agent may have a surface treatment that enhances interaction with one or more of the gas or the polymer composition.

According to still another aspect, the polymer-based foam matrix may have an average cell size ($\varphi$) less than or equal to about 450 μm. For example, the polymer-based foam matrix may have an average cell size ($\varphi$) less than or equal to about 400 μm, less than or equal to about 350 μm, less than or equal to about 300 μm, less than or equal to about 250 μm, less than or equal to about 200 μm, less than or equal to about 150 μm, less than or equal to about 100 μm, less than or equal to about 50 μm, less than or equal to about 25 μm, or less than or equal to about 20 μm.

According to still another aspect, the polymer-based foam matrix may have an average cell size ($\varphi$) in a range from about 10 μm to about 450 μm. For example, the polymer-based foam matrix may have an average cell size ($\varphi$) in a range from about 100 μm to about 400 μm, from about 100 μm to about 300 μm, from about 50 μm to about 250 μm, from about 10 μm to about 100 μm, from about 200 μm to about 400 μm, from about 200 μm to about 300 μm, from about 100 μm to about 150 μm, from about 10 μm to about 50 μm, from about 10 μm to about 30 μm, or from about 50 μm to about 100 μm.

According to another aspect, the polymer-based foam matrix may have an average cell size less than the critical defect size of the polymer.

According to a further aspect, the polymer-based foam matrix may have a cell density ($N_f$) greater than or equal to about $3.0 \times 10^7$ per $cm^3$. For example, the polymer-based foam matrix may have a cell density ($N_f$) greater than or equal to about $5.0 \times 10^7$ per $cm^3$, greater than or equal to about $7.0 \times 10^7$ per $cm^3$, greater than or equal to about $8.0 \times 10^7$ per $cm^3$, greater than or equal to about $9.0 \times 10^7$ per $cm^3$, greater than or equal to about $1.0 \times 10^8$ per $cm^3$, greater than or equal to about $1.3 \times 10^8$ per $cm^3$, greater than or equal to about $1.5 \times 10^8$ per $cm^3$, greater than or equal to about $1.8 \times 10^8$ per $cm^3$, greater than or equal to about $2.0 \times 10^8$ per $cm^3$, greater than or equal to about $2.3 \times 10^8$ per $cm^3$, greater than or equal to about $2.5 \times 10^8$ per $cm^3$, greater than or equal to about $2.8 \times 10^8$ per $cm^3$, or greater than or equal to about $3.0 \times 10^8$ per $cm^3$.

According to a further aspect, the polymer-based foam matrix may have a cell density ($N_f$) in a range from about $3.0 \times 10^7$ per $cm^3$ to about $4.0 \times 10^8$ per $cm^3$. For example, the polymer-based foam matrix may have a cell density ($N_f$) in a range from about $5.0 \times 10^7$ per $cm^3$ to about $3.0 \times 10^8$ per $cm^3$, from about $7.0 \times 10^7$ per $cm^3$ to about $3.0 \times 10^8$ per $cm^3$, from about $1.0 \times 10^8$ per $cm^3$ to about $3.0 \times 10^8$ per $cm^3$, from about $1.0 \times 10^8$ per $cm^3$ to about $2.0 \times 10^8$ per $cm^3$, from about $2.0 \times 10^8$ per $cm^3$ to about $3.0 \times 10^8$ per $cm^3$, from about $3.0 \times 10^8$ per $cm^3$ to about $4.0 \times 10^8$ per $cm^3$, from about $1.5 \times 10^8$ per $cm^3$ to about $2.5 \times 10^8$ per $cm^3$, from about $5.0 \times 10^7$ per $cm^3$ to about $1.0 \times 10^8$ per $cm^3$, or from about $7.0 \times 10^7$ per $cm^3$ to about $1.0 \times 10^8$ per $cm^3$.

According to another aspect, the mineral nucleating agent may have a BET surface area greater than or equal to about $3.0$ $m^2/g$. For example, the mineral nucleating agent may have a BET surface area greater than or equal to about 10 $m^2/g$, greater than or equal to about 50 $m^2/g$, greater than or equal to about 75 $m^2/g$, greater than or equal to about 90 $m^2/g$, greater than or equal to about 100 $m^2/g$, greater than or equal to about 150 m²/g, greater than or equal to about 200 m²/g, greater than or equal to about 250 m²/g, or greater than or equal to about 300 m²/g.

According to another aspect, the mineral nucleating agent may have a BET surface area in a range from about 3.0 m²/g to about 300 m²/g. For example, the mineral nucleating agent may have a BET surface area in a range from about 3 m²/g to about 30 m²/g, from about 10 m²/g to about 100 m²/g, from about 100 m²/g to about 300 m²/g, from about 50 m²/g to about 150 m²/g, from about 10 m²/g to about 50 m²/g, from about 3 m²/g to about 25 m²/g, from about 150 m²/g to about 250 m²/g, from about 200 m²/g to about 300 m²/g, or from about 100 m²/g to about 200 m²/g.

According to still another aspect, the mineral nucleating agent may have a median particle size ($d_{50}$) greater than or equal to about 1 μm, such as, for example, greater than or equal to about 3 μm, greater than or equal to about 5 μm, greater than or equal to about 7 μm, greater than or equal to about 9 μm, greater than or equal to about 10 μm, greater than or equal to about 11 μm, greater than or equal to about 12 μm, greater than or equal to about 13 μm, greater than or equal to about 14 μm, or greater than or equal to about 15 μm.

According to still another aspect, the mineral nucleating agent may have a median particle size ($d_{50}$) in a range from about 1 μm to about 15 μm, such as, for example, from about 1 μm to about 5 μm, from about 5 μm to about 10 μm, from about 10 μm to about 15 μm, from about 1 μm to about 3 μm, from about 3 μm to about 6 μm, from about 6 μm to about 9 μm, from about 9 μm to about 12 μm, or from about 12 μm to about 15 μm.

According to yet another aspect, the mineral nucleating agent may have an oil absorption greater than or equal to about 300 wt %, such as, for example, greater than or equal to about 320 wt %, greater than or equal to about 350 wt %, greater than or equal to about 370 wt %, greater than or equal to about 400 wt %, greater than or equal to about 420 wt %, or greater than or equal to about 450 wt %.

According to yet another aspect, the mineral nucleating agent may have a water absorption greater than or equal to about 400 wt %, such as, for example, greater than or equal to about 420 wt %, greater than or equal to about 450 wt %, greater than or equal to about 470 wt %, greater than or equal to about 500 wt %, greater than or equal to about 520 wt %, greater than or equal to about 550 wt %, or greater than or equal to about 570 wt %.

According to still another aspect, the mineral nucleating agent may have an aspect ratio in the range of from about 1 to about 50, such as, for example, from about 1 to about 25, from about 1.5 to about 20, from about 2 to about 10, from about 10 to about 40, or from about 20 to about 40.

According to another aspect, the polymer foam composition may have a relative density compared to the respective unfoamed base materials, in a range from about 0.20 to 0.90, such as, for example, in a range from about 0.25 to about 0.40, from about 0.40 to about 0.60, from about 0.60 to about 0.80, from about 0.25 to about 0.35, from about 0.35 to about 0.50, from about 0.50 to about 0.75, or from about 0.60 to about 0.75.

DESCRIPTION OF THE DRAWINGS

Exemplary embodiments will be further illustrated by reference to the following figures.

DETAILED DESCRIPTION

Figure 1:
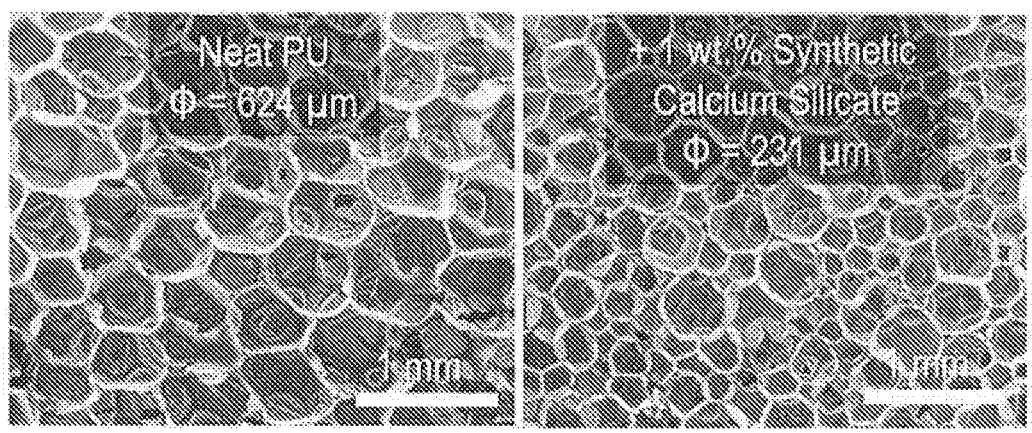
FIG. 1 shows scanning electron microscope (SEM) images of polyurethane foams.

According to some embodiments, the present disclosure may provide for polymer foams prepared using an alkaline earth metal nucleating agent.

As used herein, "surface area" refers to a BET surface area. "BET surface area," as used herein, refers to the technique for calculating specific surface area of physical absorption molecules according to Brunauer, Emmett, and Teller ("BET") theory. BET surface area can be measured with an ASAP® 2460 Surface Area and Porosimetry Analyzer using nitrogen as the sorbent gas, available from Micromeritics Instrument Corporation (Norcross, Ga., USA).

According to some embodiments, the alkaline earth metal silicate may have an aspect ratio according to Jennings theory. The Jennings theory (or Jennings approximation) of aspect ratio is based on research performed by W. Pabst, E. Gregorova, and C. Berthold, Department of Glass and Ceramics, Institute of Chemical Technology, Prague, and Institut für Geowissenschaften, Universität Tübingen, Germany, as described, e.g., in Pabst W., Berthold C.: Part. Part. Syst. Charact. 24 (2007), 458.

Unless otherwise indicated herein, the cellular structure of the various foams described in this disclosure was studied using a HITACHI S-4300SE/N scanning electron microscope (SEM) from samples cryogenically fractured using liquid nitrogen and made conductive by sputter deposition of a thin layer of carbon. The average cell size (φ) and cell density ($N_f$) were directly obtained from low-magnification micrographs using the intercept counting method described in G. L. A. Sims and C. Khunniteekool, "Cell size measurement of polymeric foams," *Cellular Polymers*, 13, 137 (1994). In particular, cell density, $N_f$, was determined according to the following equation:

$$N_f = \left(\frac{n}{A}\right)^{\frac{3}{2}} \cdot \left(\frac{\rho_s}{\rho_f}\right),$$

where n is the number of cells per area A (in cm²), and $\rho_s$ and $\rho_f$ are respectively the solid and foam densities.

The particle size properties for the minerals were measured according to the methods know to the skilled person in the art using light scattering of the particulate materials in a fully dispersed condition in an aqueous medium using a Microtrac S3500 laser diffraction machine supplied by Microtrac, a member of Nikkiso. The size of the particles is referred to as the "equivalent spherical diameter" (esd). The measured particle size can be provided as a plot of the cumulative percentage by weight of particles having a given size less than the esd values. The median particle size, $d_{50}$, is the value determined to be the esd at which 50% of the particles by weight have an esd less than that of the particular value.

The "lamellarity index" characterizes the shape of the particle, and more particularly, its flatness (large dimension/thickness). In the following description, the lamellarity index is measured by the difference between the value of the mean dimension of the particles of the powder obtained by a particle size measurement by Malvern laser diffraction using a wet method (standard AFNOR NFX11-666) and the value of the mean diameter $d_{50}$ obtained by a measurement by sedimentation using a "Sedigraph" (standard AFNOR X11-683), the difference being related to the mean diameter $d_{50}$. Reference may be made to the article by G. BAUDET and J. P. RONA, Ind. Min. Mines et Carr. Les Techn. June, July 1990, pp. 55-61, which shows that this index is correlated to the mean ratio of the largest dimension of the particle to its smallest dimension. A high aspect ratio mineral, as used in this disclosure, is one with a lamellarity index greater than 2.8.

According to some embodiments, alkaline earth metal silicates may be suitable for use as nucleating agents and/or fillers in the production of polymer foams. The polymer foams may be selected from thermoplastic materials, thermoplastic elastomers foamed with physical blowing agents, or other polymer foams, such as, for example, polystyrene, polypropylene, polyurethane, poly(ethyl vinyl acetate) (EVA), or polyethylene terephthalate (PET) foams. In some embodiments, polypropylene foams may be suited for use in the food packaging and the automotive industries. In some embodiments, polystyrene foams may be suitable for use as, for example, packaging products, insulating materials, or automotive products. In some embodiments, PET foams may be suitable for use in shipping materials, in structural components, such as automotive or aeronautical components, or in consumer goods, such as cups, boxes, or plates. In some embodiments, EVA foams may be suitable for consumer goods, such as shoes, surfboards, orthotics, or automotive or aeronautical components.

Furthermore, according to certain embodiments the compositions and methods disclosed herein may provide improved properties, regardless of whether they were produced using a two-step extrusion-mixing and foaming process, a single-step injection-moulding foaming process, or another suitable foaming process. According to some embodiments, when a single-step injection-moulding foaming process is used, advantageous physical properties may be obtained in both the flow direction (FD) of the moulding and the transversal direction (TD) to the moulding direction.

Polymer foams having desirable properties may be produced according to interactions between a blowing agent and the surface of a mineral nucleating agent, such as, for example, an alkaline earth metal silicate. Selection of the blowing agent and alkaline earth metal silicate can be used to reduce cell size in polymer foams and to encourage cell formation. Without wishing to be bound to a particular theory, it is believed that a nucleating agent surface with strong interactions with a gas (e.g., blowing agent) may reduce the activation energy for bubble nucleation in the foam, thereby increasing the cell nucleation rate and reducing the cell size. According to some embodiments, a high surface area, $CO_2$-philic or $N_2$-philic alkaline earth metal silicate may act as an efficient cell nucleator in polymer foams. When a blowing agent other than $CO_2$ or $N_2$ is used, such as, for example, an organic gas, the alkaline earth metal silicate may be selected to have an affinity to the blowing agent.

According to some embodiments, the size of cells within a polymer foam may be controlled by the bubble formation mechanism. For example, the cell size and distribution within a polymer foam can be controlled by a combination of the nucleation rate of bubbles and the growth rate of the bubbles. This nucleation and growth can be described by classic nucleation theory. Briefly, classic nucleation theory states that the formation of a bubble from a homogeneous polymer-gas solution is an energetically unfavorable process with an associated activation energy. The activation energy of the formation is inversely proportional to the cell nucleation rate. After a stable bubble forms, it then grows in size by depleting the surrounding solution of gas. In polymer foams, the activation energy associated with the bubble nucleation is the limiting factor in the number of bubbles created within a given volume.

According to some embodiments, the activation energy associated with bubble nucleation can be reduced through heterogeneous nucleation. In this heterogeneous nucleation, the surface between a nucleating agent and the polymer may promote bubble formation by increasing the interfacial order of the gas bubble. Increasing the interfacial order of the gas bubble may reduce the energetic barrier to nucleation by providing a favorable surface for nucleation. Such surfaces may have a surface energy that encourages wetting of the surface by the gas. In addition, these surfaces may have a high surface area in order to maximize the nucleation site density. Reducing the activation energy may provide a strategy for controlling the cell structure of polymer foams and controlling their mechanical properties.

According to some embodiments, a method of producing a polymer foam may include providing a polymer composition, introducing an alkaline earth metal silicate into the polymer composition, and foaming the polymer composition using a gas to form a polymer foam.

According to some embodiments, a method of producing a polymer-matrix may include providing a polymer composition, nucleating the polymer composition with an alkaline earth metal silicate, and using a blowing agent to form a polymer foam from the polymer composition. The alkaline earth metal silicate may facilitate nucleation of the cells in the polymer foam.

According to some embodiments, introducing the alkaline earth metal silicate may include introducing the alkaline earth metal silicate into the polymer composition using an extrusion-mixing process.

According to some embodiments, the polymer composition may include at least one of a thermoplastic polymer or a thermoplastic elastomer. For example, the polymer composition may include at least one of polystyrene, polyethylene, polypropylene, polyurethane, polyurethane, poly (ethyl vinyl acetate) (EVA), polyethylene terephthalate (PET), or copolymers thereof. According to some embodiments, the polymer composition may include a thermoset polymer, such as, for example, a polyester or a urea-formaldehyde polymer. According to some embodiments, the polymer composition may include a polyolefin. According to some embodiments, the polymer composition may include at least one of a thermoplastic polymer or a thermoplastic elastomer. In another embodiment, the polymer composition may include at least one polymer selected from the group consisting of a polyolefin, a polyamide, a polycarbonate, a polyimide, a polyurethane, a polyethylenemine, a polyoxymethylene, a polyester, a polyacrylate, and copolymers and blends thereof. In another embodiment, the polymer composition may include at least polymer selected from the group consisting of a polystyrene, a polyethylene, a polypropylene, a polystyrene, a polyamide, a polyurethane, a poly(ethyl vinyl acetate), a polyethylene terephthalate, and copolymers and blends thereof.

According to some embodiments, the polymer foams may include other fillers or additives. The fillers or additives may include, for example, additives, pigments, or reinforcing fillers. According to some embodiments, the additives or fillers may include, for example, talc, calcium carbonate, kaolin, diatomaceous earth, metal carbonates, or metal silicates.

According to some embodiments, the blowing agent may include at least one of $CO_2$, $N_2$, or an organic gas. An organic gas may include, for example, hexane, propane, butane, n-butane, i-butane, pentane, i-pentane, n-pentane, $CHF_2Cl$, $CF_2ClCH_3$, $CHF_2CH_3$, $CHCl_2CF_3$, $CHFClCF_2Cl$, $CHFClCF_3$, $CH_2FCF_3$, $CH_3CF_3$, $CFCl_3$, $CF_2Cl_2$, $CFCl_2CF_2Cl$, $CF_2ClCF_2Cl$, $CH_3Cl$, or $CH_2Cl_2$.

According to some embodiments, the polymer composition may be the major component of the polymer foam. For example, the polymer composition may be present in an amount greater than about 50% by weight of the polymer foam, greater than about 55%, greater than about 60%, greater than about 65%, greater than about 70%, greater than about 75%, greater than about 80%, greater than about 85%, greater than about 90%, greater than about 92%, greater than about 95%, greater than about 96%, greater than about 97%, greater than about 98%, greater than about 98.5%, greater than about 99%, greater than about 99.5%, or greater than about 99.7% by weight of the polymer foam.

According to some embodiments, the alkaline earth metal silicate or nucleating agent may be present in an amount in a range from about 1% by weight to about 30% by weight of the polymer foam, such as, for example, in a range from about 5% by weight to about 20% by weight, from about 5% by weight to about 15% by weight, from about 10% by weight to about 20% by weight, from about 15% by weight to about 25% by weight, or from about 20% by weight to about 25% by weight of the polymer foam.

According to some embodiments, the alkaline earth metal silicate may include at least one of calcium silicate, magnesium silicate, beryllium silicate, strontium silicate, or barium silicate. In some embodiments, the calcium silicate may include a synthetic calcium silicate. In some embodiments, the calcium silicate may include a natural calcium silicate, such as, for example, a Wollastonite. According to some embodiments, the alkaline earth metal silicate may include a derived calcium silicate, such as, for example, diatomaceous earth-derived calcium silicate. According to another aspect, the alkaline earth metal silicate may include a blend of alkaline earth metal silicates.

According to some embodiments, the alkaline earth metal silicate may include magnesium oxysulfate as a secondary mineral (a secondary mineral nucleating agent). In some embodiments, the magnesium oxysulfate may have an aspect ratio ranging from about 1 to about 50, such as, for example, from about 1 to about 40, or from about 10 to about 40. In some embodiments, the alkaline earth metal silicate may include a secondary mineral selected from a kaolin, a bentonite, a talc, a chloritic talc, a milled expanded perlite, and a diatomaceous earth.

According to some embodiments, the alkaline earth metal silicate may include a functionalized alkaline earth metal silicate. The functionalized alkaline earth metal silicate may have a surface treatment that enhances interaction with one or more of the gas or the polymer composition.

According to some embodiments, the alkaline earth metal silicate may include a blend of a talc and a chloritic talc. For example, the alkaline earth metal silicate may include talc as a mineral and chloritic talc as a secondary mineral, or may include chloritic talc as a mineral and talc as a secondary mineral.

According to some embodiments, the polymer foam composition may have a flexural modulus greater than or equal to about 1000 MPa, such as, for example, greater than or equal to about 1300 MPa, greater than or equal to about 1500 MPa, greater than or equal to about 1700 MPa, greater than or equal to about 2000 MPa, greater than or equal to about 2100 MPa, greater than or equal to about 2300 MPa, or greater than or equal to about 2500 MPa.

According to some embodiments, the polymer foam composition may have a flexural modulus in a range from about 1000 MPa to about 3000 MPa, such as, for example, in a range from about 1300 MPa to about 2800 MPa, from about 1500 MPa to about 2300 MPa, or from about 2000 MPa to about 2600 MPa.

According to some embodiments, the polymer foam composition may have a first flexural modulus. The first flexural modulus may be greater than a flexural modulus of a comparative polymer foam composition having an alkaline earth metal silicate that includes one of the mineral and the secondary mineral individually.

According to some embodiments, the polymer foam composition having a mineral nucleating agent and a secondary mineral nucleating agent may have an impact resistance that is not adversely affected relative to a polymer foam composition having a mineral nucleating agent that includes one of the mineral and the secondary mineral individually.

According to some embodiments, the polymer foam composition may have a weight reduction greater than or equal to about 5% as compared to the same volume of the non-foamed polymer, such as, for example, greater than or equal to about 10%, greater than or equal to about 15%, or greater than or equal to about 20% as compared to the same volume of the non-foamed polymer.

According to some embodiments, the polymer foam composition may have a weight reduction in a range from about 5% to about 30% as compared to the same volume of the non-foamed polymer.

According to some embodiments, the alkaline earth metal silicate may have a lamellarity index greater than about 2.8, such as, for example, greater than or equal to about 3.0, greater than or equal to about 3.5, or greater than or equal to about 4.0.

According to some embodiments, the polymer foam may have an average cell size ($\varphi$) less than or equal to about 450 µm. For example, the polymer foam may have an average cell size ($\varphi$) less than or equal to about 400 µm, less than or equal to about 350 µm, less than or equal to about 300 µm, less than or equal to about 250 µm, less than or equal to about 200 µm, less than or equal to about 150 µm, less than or equal to about 100 µm, less than or equal to about 50 µm, less than or equal to about 25 µm, or less than or equal to about 20 µm.

According to some embodiments, the polymer foam may have an average cell size ($\varphi$) in a range from about 10 µm to about 450 µm. For example, the polymer foam may have an average cell size ($\varphi$) in a range from about 100 µm to about 400 µm, from about 100 µm to about 300 µm, from about 50 µm to about 250 µm, from about 10 µm to about 100 µm, from about 200 µm to about 400 µm, from about 200 μm to about 300 μm, from about 100 μm to about 150 μm, from about 10 μm to about 50 μm, from about 10 μm to about 30 μm, or from about 50 μm to about 100 μm.

According to some embodiments, the polymer foam may have an average cell size less than the critical defect size of the polymer composition.

According to some embodiments, the polymer foam may have a cell density ($N_f$) greater than or equal to about $3.0\times10^7$ per cm$^3$. For example, the polymer foam may have a cell density ($N_f$) greater than or equal to about $5.0\times10^7$ per cm$^3$, greater than or equal to about $7.0\times10^7$ per cm$^3$, greater than or equal to about $8.0\times10^7$ per cm$^3$, greater than or equal to about $9.0\times10^7$ per cm$^3$, greater than or equal to about $1.0\times10^8$ per cm$^3$, greater than or equal to about $1.3\times10^8$ per cm$^3$, greater than or equal to about $1.5\times10^8$ per cm$^3$, greater than or equal to about $1.8.0\times10^8$ per cm$^3$, greater than or equal to about $2.0\times10^8$ per cm$^3$, greater than or equal to about $2.3\times10^8$ per cm$^3$, greater than or equal to about $2.5\times10^8$ per cm$^3$, greater than or equal to about $2.8\times10^8$ per cm$^3$, or greater than or equal to about $3.0\times10^8$ per cm$^3$.

According to some embodiments, the polymer foam may have a cell density ($N_f$) in a range from about $3.0\times10^7$ per cm$^3$ to about $4.0\times10^8$ per cm$^3$. For example, the polymer foam may have a cell density ($N_f$) in a range from about $5.0\times10^7$ per cm$^3$ to about $3.0\times10^8$ per cm$^3$, from about $7.0\times10^7$ per cm$^3$ to about $3.0\times10^8$ per cm$^3$, from about $1.0\times10^8$ per cm$^3$ to about $3.0\times10^8$ per cm$^3$, from about $1.0\times10^8$ per cm$^3$ to about $2.0\times10^8$ per cm$^3$, from about $2.0\times10^8$ per cm$^3$ to about $3.0\times10^8$ per cm$^3$, from about $3.0\times10^8$ per cm$^3$ to about $4.0\times10^8$ per cm$^3$, from about $1.5\times10^8$ per cm$^3$ to about $2.5\times10^8$ per cm$^3$, from about $5.0\times10^7$ per cm$^3$ to about $1.0\times10^8$ per cm$^3$, or from about $7.0\times10^7$ per cm$^3$ to about $1.0\times10^8$ per cm$^3$.

According to some embodiments, the alkaline earth metal silicate may have a BET surface area greater than or equal to about 3.0 m$^2$/g. For example, the alkaline earth metal silicate may have a BET surface area greater than or equal to about 10 m$^2$/g, greater than or equal to about 50 m$^2$/g, greater than or equal to about 75 m$^2$/g, greater than or equal to about 90 m$^2$/g, greater than or equal to about 100 m$^2$/g, greater than or equal to about 150 m$^2$/g, greater than or equal to about 200 m$^2$/g, greater than or equal to about 250 m$^2$/g, or greater than or equal to about 300 m$^2$/g.

According to some embodiments, the alkaline earth metal silicate may have a BET surface area in a range from about 3.0 m$^2$/g to about 300 m$^2$/g. For example, the alkaline earth metal silicate may have a BET surface area in a range from about 3 m$^2$/g to about 30 m$^2$/g, from about 10 m$^2$/g to about 100 m$^2$/g, from about 100 m$^2$/g to about 300 m$^2$/g, from about 50 m$^2$/g to about 150 m$^2$/g, from about 10 m$^2$/g to about 50 m$^2$/g, from about 3 m$^2$/g to about 25 m$^2$/g, from about 150 m$^2$/g to about 250 m$^2$/g, from about 200 m$^2$/g to about 300 m$^2$/g, or from about 100 m$^2$/g to about 200 m$^2$/g.

According to some embodiments, the alkaline earth metal silicate may have a median particle size ($d_{50}$) greater than or equal to about 1 μm, such as, for example, greater than or equal to about 3 μm, greater than or equal to about 5 μm, greater than or equal to about 7 μm, greater than or equal to about 9 μm, greater than or equal to about 10 μm, greater than or equal to about 11 μm, greater than or equal to about 12 μm, greater than or equal to about 13 μm, greater than or equal to about 14 μm, or greater than or equal to about 15 μm.

According to some embodiments, the alkaline earth metal silicate may have a median particle size ($d_{50}$) in a range from about 1 μm to about 15 μm, such as, for example, from about 1 μm to about 5 μm, from about 5 μm to about 10 μm, from about 10 μm to about 15 μm, from about 1 μm to about 3 μm, from about 3 μm to about 6 μm, from about 6 μm to about 9 μm, from about 9 μm to about 12 μm, or from about 12 μm to about 15 μm.

According to some embodiments, the method may include a two-step extrusion-mixing and foaming process. According to still another aspect, the method may include a single-step injection-moulding foaming process.

According to some embodiments, the alkaline earth metal silicate may have an oil absorption greater than or equal to about 300 wt %, such as, for example, greater than or equal to about 320 wt %, greater than or equal to about 350 wt %, greater than or equal to about 370 wt %, greater than or equal to about 400 wt %, greater than or equal to about 420 wt %, or greater than or equal to about 450 wt %.

According to some embodiments, the alkaline earth metal silicate may have a water absorption greater than or equal to about 400 wt %, such as, for example, greater than or equal to about 420 wt %, greater than or equal to about 450 wt %, greater than or equal to about 470 wt %, greater than or equal to about 500 wt %, greater than or equal to about 520 wt %, greater than or equal to about 550 wt %, or greater than or equal to about 570 wt %.

According to some embodiments, the alkaline earth metal silicate may have an aspect ratio in the range of from about 1 to about 50, such as, for example, from about 1 to about 25, from about 1.5 to about 20, from about 2 to about 10, from about 10 to about 40, or from about 20 to about 40.

According to some embodiments, the polymer foam may have a relative density compared to the respective unfoamed base materials, in a range from about 0.20 to 0.90, such as, for example, in a range from about 0.25 to about 0.40, from about 0.40 to about 0.60, from about 0.60 to about 0.80, from about 0.25 to about 0.35, from about 0.35 to about 0.50, from about 0.50 to about 0.75, or from about 0.60 to about 0.75.

According to some embodiments, a polymer foam composition may include a polymer-based foam matrix and a mineral nucleating agent within a cell of the polymer-based foam matrix.

According to some embodiments, the mineral nucleating agent may include alkaline earth metal silicate. According to some embodiments, the mineral nucleating agent may include at least one of magnesium oxysulfate, kaolin, talc, chloritic talc, perlite, expanded milled perlite, diatomaceous earth, glass cullet, feldspar, nepheline syenite, or bentonite. According to some embodiments, talc or chloritic talc may include at least one of a lamellar talc, micro-lamellar talc, microcrystalline talc, and macrocrystalline talc.

According to some embodiments, the mineral nucleating agent may have a high aspect ratio. According to some embodiments, the talc or chloritic talc may include one or more of a high aspect ratio talc, a high aspect ratio lamellear talc, a high aspect ratio micro-lamellar talc, a high aspect ratio chloritic talc, a high aspect ratio lamellar chloritic talc, and a high aspect ratio micro-lamellar chloritic talc.

According to some embodiments, a high aspect ratio of the mineral nucleating agent may be achieved by a wet-milling process.

According to some embodiments, the mineral nucleating agent may include a blend of a talc and a chloritic talc. For example, the mineral nucleating agent may include talc as a mineral and chloritic talc as a secondary mineral, or may include chloritic talc as a mineral and talc as a secondary mineral.

According to some embodiments, the polymer foam composition may have a flexural modulus greater than or equal to about 1000 MPa, such as, for example, greater than or equal to about 1300 MPa, greater than or equal to about 1500 MPa, greater than or equal to about 1700 MPa, greater than or equal to about 2000 MPa, greater than or equal to about 2100 MPa, greater than or equal to about 2300 MPa, or greater than or equal to about 2500 MPa.

According to some embodiments, the polymer foam composition may have a flexural modulus in a range from about 1000 MPa to about 3000 MPa, such as, for example, in a range from about 1300 MPa to about 2800 MPa, from about 1500 MPa to about 2300 MPa, or from about 2000 MPa to about 2600 MPa.

According to some embodiments, the polymer foam composition may have a first flexural modulus. The first flexural modulus may be greater than a flexural modulus of a comparative polymer foam composition having a mineral nucleating agent that includes one of the mineral and the secondary mineral individually.

According to some embodiments, the polymer foam composition having a mineral nucleating agent and a secondary mineral nucleating agent may have an impact resistance that is not adversely affected relative to a polymer foam composition having a mineral nucleating agent that includes one of the mineral and the secondary mineral individually.

According to some embodiments, the polymer foam composition may have a weight reduction greater than or equal to about 5% as compared to the same volume of the non-foamed polymer, such as, for example, greater than or equal to about 10%, greater than or equal to about 15%, or greater than or equal to about 20% as compared to the same volume of the non-foamed polymer.

According to some embodiments, the polymer foam composition may have a weight reduction in a range from about 5% to about 30% as compared to the same volume of the non-foamed polymer.

According to some embodiments, the mineral nucleating agent may have a high aspect ratio.

According to some embodiments, the mineral nucleating agent may have a lamellarity index greater than about 2.8, such as, for example, greater than or equal to about 3.0, greater than or equal to about 3.5, or greater than or equal to about 4.0.

According to some embodiments, a high aspect ratio of the mineral nucleating agent may be achieved by a wet-milling process.

According to some embodiments, the polymer-based foam matrix may include at least one of a thermoplastic polymer matrix or a thermoplastic elastomer matrix. According to some embodiments, the polymer-based foam matrix may include at least one of a polyethylene matrix, polystyrene matrix, polypropylene matrix, polyurethane matrix, poly(ethyl vinyl acetate) (EVA) matrix, polyethylene terephthalate (PET) matrix, or copolymer matrices thereof. According to some embodiments, the polymer-based foam matrix may include a polyolefin matrix.

According to some embodiments, the blowing agent used to form the polymer-based foam matrix may include at least one of $CO_2$, $N_2$, or an organic gas. An organic gas may include, for example, hexane, propane, butane, n-butane, i-butane, pentane, i-pentane, n-pentane, $CHF_2Cl$, $CF_2ClCH_3$, $CHF_2CH_3$, $CHCl_2CF_3$, $CHFClCF_2Cl$, $CHFClCF_3$, $CH_2FCF_3$, $CH_3CF_3$, $CFCl_3$, $CF_2Cl_2$, $CFCl_2CF_2Cl$, $CF_2ClCF_2Cl$, $CH_3Cl$, or $CH_2Cl_2$.

According to some embodiments, the polymer-based foam matrix may be the major component of the polymer foam composition. For example, the polymer-based foam matrix may be present in an amount greater than about 50% by weight of the polymer foam composition, greater than about 55%, greater than about 60%, greater than about 65%, greater than about 70%, greater than about 75%, greater than about 80%, greater than about 85%, greater than about 90%, greater than about 92%, greater than about 95%, greater than about 96%, greater than about 97%, greater than about 98%, greater than about 98.5%, greater than about 99%, greater than about 99.5%, or greater than about 99.7% by weight of the polymer foam composition.

According to some embodiments, the alkaline earth metal silicate or nucleating agent may be present in an amount in a range from about 1% by weight to about 30% by weight of the polymer foam composition, such as, for example, in a range from about 5% by weight to about 20% by weight, from about 5% by weight to about 15% by weight, from about 10% by weight to about 20% by weight, from about 15% by weight to about 25% by weight, or from about 20% by weight to about 25% by weight of the polymer foam composition.

According to some embodiments, the alkaline earth metal silicate may include at least one of calcium silicate, magnesium silicate, beryllium silicate, strontium silicate, or barium silicate. In some embodiments, the calcium silicate may include a synthetic calcium silicate. In some embodiments, the calcium silicate may include a natural calcium silicate, such as, for example, a Wollastonite. According to some embodiments, the alkaline earth metal silicate may include a derived calcium silicate, such as, for example, diatomaceous earth-derived calcium silicate. According to some embodiments, the alkaline earth metal silicate may include a blend of alkaline earth metal silicates.

According to another aspect, the mineral nucleating agent may include alkaline earth metal silicate. According to another aspect, the mineral nucleating agent may include at least one of magnesium oxysulfate, kaolin, talc, chloritic talc, perlite, expanded milled perlite, diatomaceous earth, glass cullet, feldspar, nepheline syenite, or bentonite. According to some embodiments, talc or chloritic talc may include at least one of a lamellar talc, micro-lamellar talc, microcrystalline talc, and macrocrystalline talc.

According to some embodiments, the mineral nucleating agent may have a high aspect ratio. According to some embodiments, the talc or chloritic talc may include one or more of a high aspect ratio talc, a high aspect ratio lamellear talc, a high aspect ratio micro-lamellar talc, a high aspect ratio chloritic talc, a high aspect ratio lamellar chloritic talc, and a high aspect ratio micro-lamellar chloritic talc. In some embodiments, the mineral nucleating agent may include a secondary mineral nucleating agent (a secondary mineral).

According to some embodiments, the mineral nucleating agent may include a functionalized mineral nucleating agent. The functionalized mineral nucleating agent may have a surface treatment that may enhance interaction with one or more of the gas or the polymer composition. For example, the surface treatment may impart hydrophobic properties to the mineral nucleating agent. According to some embodiments, the surface treatment may include a silane, silicone oil, siloxane, fatty acid, salt thereof, or ester thereof. According to some embodiments, the fatty acid, salt thereof, or ester thereof may have a chain length of C8 or higher. According to some embodiments, the fatty acid may include stearic acid.

In some embodiments, the one surface treatment silanizes the mineral nucleating agent. The silanizing surface treatment may include at least one siloxane. In general, siloxanes are any of a class of organic or inorganic chemical compounds including silicon, oxygen, and often carbon and hydrogen, based on the general empirical formula of $R_2SiO$, where R may be an alkyl group. Exemplary siloxanes may include, but are not limited to, dimethylsiloxane, methylphenylsiloxane, methylhydrogen siloxane, methylhydrogen polysiloxane, methyltrimethoxysilane, octamethylcyclotetrasiloxane, hexamethyldisiloxane, diphenylsiloxane, and copolymers or blends of copolymers of any combination of monophenylsiloxane units, diphenylsiloxane units, phenylmethylsiloxane units, dimethylsiloxane units, monomethylsiloxane units, vinylsiloxane units, phenylvinylsiloxane units, methylvinylsiloxane units, ethylsiloxane units, phenylethylsiloxane units, ethylmethylsiloxane units, ethylvinylsiloxane units, or diethylsiloxane units.

In some embodiments, the silanizing surface treatment may include at least one silane. In general, silanes and other monomeric silicon compounds have the ability to bond to inorganic materials, such as the mineral nucleating agent. The bonding mechanism may be aided by two groups in the silane structure, where, for example, the $Si(OR_3)$ portion interacts with the inorganic particulate material, while the organofunctional (vinyl-, amino-, epoxy-, etc.) group may interact with other materials.

In some embodiments, the mineral nucleating agent may be subjected to a surface treatment surface-treated with at least one ionic silane. Exemplary ionic silanes include, but are not limited to, 3-(trimethoxysilyl) propyl-ethylenediamine triacetic acid trisodium salt and 3-(trihydroxysilyl) propylmethylphosphonate salt. In some embodiments, the mineral nucleating agent may be subjected to a surface treatment with at least one nonionic silane.

In a further embodiment, the mineral nucleating agent may be subjected to a surface treatment with at least one silane of Formula (I):

$$(R^1)_x Si(R^2)_{3-x} R^3 \quad (I)$$

wherein:
R$^1$ is any hydrolysable moiety that may chemically react with any active group on the surface of the inorganic particulate material, including, but not limited to, alkoxy, halogen, hydroxy, aryloxy, amino, amide, methacrylate, mercapto, carbonyl, urethane, pyrrole, carboxy, cyano, aminoacyl, acylamino, alkyl ester, and aryl ester;
X has a value between 1 and 3, such that more than one siloxane bond may be formed between the inorganic particulate material and the at least one silane;
R$^2$ is any carbon-bearing moiety that does not substantially react or interact with the inorganic particulate material during the treatment process, including, but not limited to, substituted or unsubstituted alkyl, alkenyl, alkaryl, alkcycloalkyl, aryl, cycloalkyl, cycloalkenyl, heteroaryl, heterocyclic, cycloalkaryl, cycloalkenylaryl, alkcycloalkaryl, alkcycloalkenyaryl, and arylalkaryl;
R$^3$ is any organic-containing moiety that remains substantially chemically attached to the silicon atom of Formula (I) once the at least one surface treatment is completed and that is capable of reacting or interacting with an active ingredient, such as, but not limited to, hydrogen, alkyl, alkenyl, alkaryl, alkcycloalkyl, aryl, cycloalkyl, cycloalkenyl, heteroaryl, heterocyclic, cycloalkaryl, cycloalkenylaryl, alkcycloalkaryl, alkcycloalkenyaryl, arylalkaryl, alkoxy, halogen, hydroxy, aryloxy, amino, amide, methacrylate, mercapto, carbonyl, urethane, pyrrole, alkyl ester, aryl ester, carboxy, sulphonate, cyano, aminoacyl, acylamino, epoxy, phosphonate, isothiouronium, thiouronium, alkylamino, quaternary ammonium, trialkylammonium, alkyl epoxy, alkyl urea, alkyl imidazole, or alkylisothiouronium; wherein the hydrogen of said alkyl, alkenyl, aryl, cycloalkyl, cycloalkenyl, heteroaryl, and heterocyclic is optionally substituted by, for example, halogen, hydroxy, amino, carboxy, or cyano.

In some embodiments, silanization may proceed according to "wet" or "dry" silanization processes known to the skilled artisan.

According to some embodiments, the polymer-based foam matrix may have an average cell size ($\varphi$) less than or equal to about 450 µm. For example, the polymer-based foam matrix may have an average cell size ($\varphi$) less than or equal to about 400 µm, less than or equal to about 350 µm, less than or equal to about 300 µm, less than or equal to about 250 µm, less than or equal to about 200 µm, less than or equal to about 150 µm, less than or equal to about 100 µm, less than or equal to about 50 µm, less than or equal to about 25 µm, or less than or equal to about 20 µm.

According to some embodiments, the polymer-based foam matrix may have an average cell size ($\varphi$) in a range from about 10 µm to about 450 µm. For example, the polymer-based foam matrix may have an average cell size ($\varphi$) in a range from about 100 µm to about 400 µm, from about 100 µm to about 300 µm, from about 50 µm to about 250 µm, from about 10 µm to about 100 µm, from about 200 µm to about 400 µm, from about 200 µm to about 300 µm, from about 100 µm to about 150 µm, from about 10 µm to about 50 µm, from about 10 µm to about 30 µm, or from about 50 µm to about 100 µm.

According to some embodiments, the polymer-based foam matrix may have an average cell size less than the critical defect size of the polymer.

According to another aspect, the cell size distribution of the polymer-based foam matrix may be selectively controlled by selective addition of a mineral nucleator having a desired particle size distribution. According to some embodiments, this may allow for creation of a polymer foam having narrow or broad pore size distribution by utilizing a mineral nucleator having a likewise narrow or broad particle size distribution.

According to some embodiments, the polymer-based foam matrix may have a cell density ($N_f$) greater than or equal to about $3.0 \times 10^7$ per cm$^3$. For example, the polymer-based foam matrix may have a cell density ($N_f$) greater than or equal to about $5.0 \times 10^7$ per cm$^3$, greater than or equal to about $7.0 \times 10^7$ per cm$^3$, greater than or equal to about $8.0 \times 10^7$ per cm$^3$, greater than or equal to about $9.0 \times 10^7$ per cm$^3$, greater than or equal to about $1.0 \times 10^8$ per cm$^3$, greater than or equal to about $1.3 \times 10^8$ per cm$^3$, greater than or equal to about $1.5 \times 10^8$ per cm$^3$, greater than or equal to about $1.8.0 \times 10^8$ per cm$^3$, greater than or equal to about $2.0 \times 10^8$ per cm$^3$, greater than or equal to about $2.3 \times 10^8$ per cm$^3$, greater than or equal to about $2.5 \times 10^8$ per cm$^3$, greater than or equal to about $2.8 \times 10^8$ per cm$^3$, or greater than or equal to about $3.0 \times 10^8$ per cm$^3$.

According to some embodiments, the polymer-based foam matrix may have a cell density ($N_f$) in a range from about $3.0 \times 10^7$ per cm$^3$ to about $4.0 \times 10^8$ per cm$^3$. For example, the polymer-based foam matrix may have a cell density ($N_f$) in a range from about $5.0 \times 10^7$ per cm$^3$ to about $3.0 \times 10^8$ per cm$^3$, from about $7.0 \times 10^7$ per cm$^3$ to about $3.0 \times 10^8$ per cm$^3$, from about $1.0 \times 10^8$ per cm$^3$ to about $3.0 \times 10^8$ per cm$^3$, from about $1.0 \times 10^8$ per cm$^3$ to about $2.0 \times 10^8$ per cm$^3$, from about $2.0 \times 10^8$ per cm$^3$ to about $3.0 \times 10^8$ per cm$^3$, from about $3.0 \times 10^8$ per cm$^3$ to about $4.0 \times 10^8$ per cm$^3$, from about $1.5 \times 10^8$ per cm$^3$ to about $2.5 \times 10^8$ per $cm^3$, from about $5.0 \times 10^7$ per $cm^3$ to about $1.0 \times 10^8$ per $cm^3$, or from about $7.0 \times 10^7$ per $cm^3$ to about $1.0 \times 10^8$ per $cm^3$.

According to some embodiments, the mineral nucleating agent may have a BET surface area greater than or equal to about 3.0 $m^2/g$. For example, the mineral nucleating agent may have a BET surface area greater than or equal to about 10 $m^2/g$, greater than or equal to about 50 $m^2/g$, greater than or equal to about 75 $m^2/g$, greater than or equal to about 90 $m^2/g$, greater than or equal to about 100 $m^2/g$, greater than or equal to about 150 $m^2/g$, greater than or equal to about 200 $m^2/g$, greater than or equal to about 250 $m^2/g$, or greater than or equal to about 300 $m^2/g$.

According to some embodiments, the mineral nucleating agent may have a BET surface area in a range from about 3.0 $m^2/g$ to about 300 $m^2/g$. For example, the mineral nucleating agent may have a BET surface area in a range from about 3 $m^2/g$ to about 30 $m^2/g$, from about 10 $m^2/g$ to about 100 $m^2/g$, from about 100 $m^2/g$ to about 300 $m^2/g$, from about 50 $m^2/g$ to about 150 $m^2/g$, from about 10 $m^2/g$ to about 50 $m^2/g$, from about 3 $m^2/g$ to about 25 $m^2/g$, from about 150 $m^2/g$ to about 250 $m^2/g$, from about 200 $m^2/g$ to about 300 $m^2/g$, or from about 100 $m^2/g$ to about 200 $m^2/g$.

According to some embodiments, the mineral nucleating agent may have a median particle size ($d_{50}$) greater than or equal to about 1 μm, such as, for example, greater than or equal to about 3 μm, greater than or equal to about 5 μm, greater than or equal to about 7 μm, greater than or equal to about 9 μm, greater than or equal to about 10 μm, greater than or equal to about 11 μm, greater than or equal to about 12 μm, greater than or equal to about 13 μm, greater than or equal to about 14 μm, or greater than or equal to about 15 μm.

According to some embodiments, the mineral nucleating agent may have a median particle size ($d_{50}$) in a range from about 1 μm to about 15 μm, such as, for example, from about 1 μm to about 5 μm, from about 5 μm to about 10 μm, from about 10 μm to about 15 μm, from about 1 μm to about 3 μm, from about 3 μm to about 6 μm, from about 6 μm to about 9 μm, from about 9 μm to about 12 μm, or from about 12 μm to about 15 μm.

According to some embodiments, the mineral nucleating agent may have an oil absorption greater than or equal to about 300 wt %, such as, for example, greater than or equal to about 320 wt %, greater than or equal to about 350 wt %, greater than or equal to about 370 wt %, greater than or equal to about 400 wt %, greater than or equal to about 420 wt %, or greater than or equal to about 450 wt %.

According to some embodiments, the mineral nucleating agent may have a water absorption greater than or equal to about 400 wt %, such as, for example, greater than or equal to about 420 wt %, greater than or equal to about 450 wt %, greater than or equal to about 470 wt %, greater than or equal to about 500 wt %, greater than or equal to about 520 wt %, greater than or equal to about 550 wt %, or greater than or equal to about 570 wt %.

According to some embodiments, the mineral nucleating agent may have an aspect ratio in the range of from about 1 to about 50, such as, for example, from about 1 to about 25, from about 1.5 to about 20, from about 2 to about 10, from about 10 to about 40, or from about 20 to about 40.

According to some embodiments, the polymer foam compositions may have a relative density compared to the respective unfoamed base materials, in a range from about 0.20 to 0.90, such as, for example, in a range from about 0.25 to about 0.40, from about 0.40 to about 0.60, from about 0.60 to about 0.80, from about 0.25 to about 0.35, from about 0.35 to about 0.50, from about 0.50 to about 0.75, or from about 0.60 to about 0.75.

Example 1

In this example, the cell size and distribution within a polymer foam was controlled through the addition of an alkaline earth metal silicate with a high surface area and favorable interaction with the blowing agent.

Synthetic calcium silicate was added to a commercially available 2 lb. two-part polyurethane foam provided by Morris Materials of Salt Lake City, Utah comprising 4,4' methylene bis(phenylisocyanate), polymethylene polyphenyl isocyanates, and a polyol. The synthetic calcium silicate had a high surface area, about 95 $m^2/g$, a high water absorption (about 550 wt %), and a high oil absorption (about 420 wt %). $CO_2$, generated through the reaction of moisture and isocyanate, was used as the physical blowing agent.

To prepare the samples, 1 wt % of the synthetic calcium silicate relative to the total mass of the final polyurethane mixture was added to the polyol and mixed in a speedmixer for 5 minutes at 3000 rpm. Next, an equal weight of isocynate mixture was added to the polyol and mixed for 25 seconds at 3000 rpm until cream in color. The mixture was allowed to foam and cure at room temperature and pressure for 10 minutes. A control polyurethane foam was prepared under similar conditions, but without the synthetic calcium silicate nucleating agent.

To analyze the foam composition, the foam was fractured in ambient conditions and micrographs collected using a scanning electron microscope. Images of the foam composition having a calcium silicate nucleating agent as compared to a neat polyurethane foam without a nucleating agent are shown in FIG. 1. The cell size of the nucleated and non-nucleated foams was computed using ImageJ software and averaged over 4 images for each foam. The control polyurethane foam exhibited an average cell diameter of 624 μm±385 μm. The exemplary nucleated foam having 1 wt % synthetic calcium silicate reduced average cell diameter by about 63%, having an average cell diameter of 231 μm±190 μm.

Figure 2:
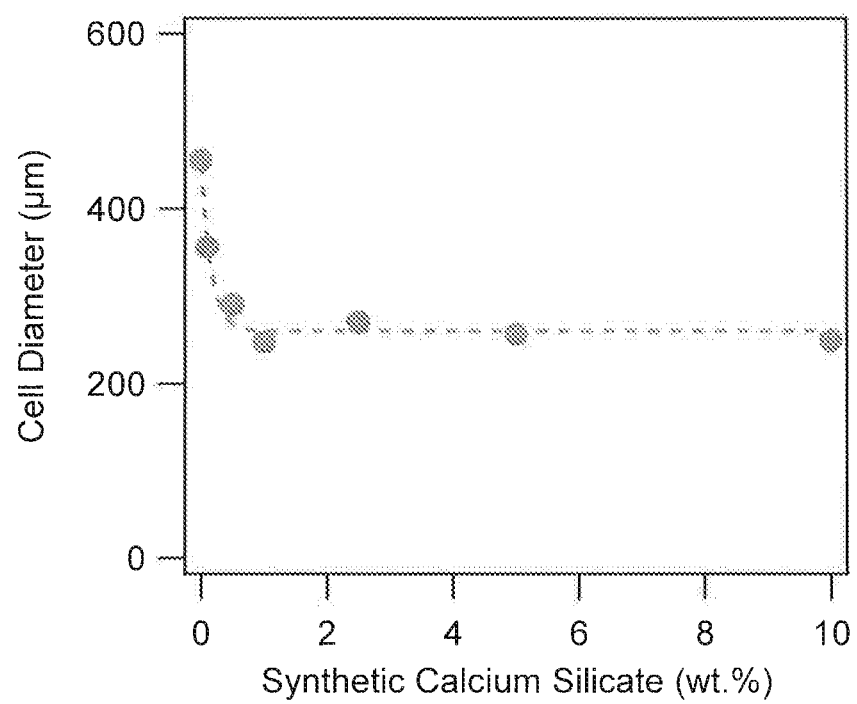
FIG. 2 shows a graph of cell diameter versus weight percent calcium silicate for exemplary polymer foams.

The efficiency of cell nucleation was then investigated by varying the amount of the synthetic calcium silicate from 0.1 wt % to 10 wt % relative to the total mass. The polymers were prepared as described in this example with varying weight percent of synthetic calcium silicate and then foamed. The cell diameter as a function of the weight percent of synthetic calcium silicate was determined. A graph of the average cell diameter versus the weight percent of synthetic calcium silicate is shown in FIG. 2. As shown in FIG. 2, when calcium silicate is added in an amount up to about 1 wt %, the cell diameter is reduced. Above about 1 wt % synthetic calcium silicate, the cell diameter does not appear to be reduced further. Without wishing to be bound by a particular theory, it is believed that the apparent reduction limit in the cell size after about 1 wt % synthetic calcium silicate results from saturation of the material because of the limited availability of blowing agent. These findings indicate that synthetic calcium silicate may be a promising bubble nucleator for chemically blown systems.

Example 2

Figure 3:
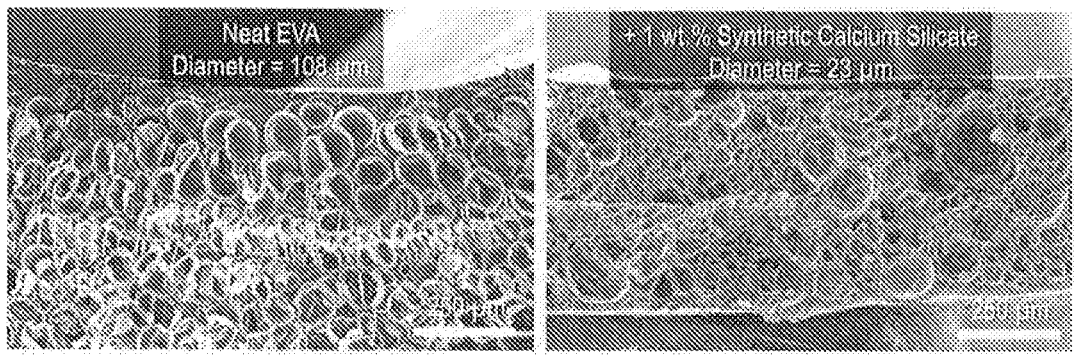
FIG. 3 shows scanning electron microscope (SEM) images of exemplary poly(ethyl vinyl acetate) (EVA) polymer foams.

The cell nucleation ability of calcium silicate was examined in a physically blown system using $CO_2$ as the blowing agent. Poly(ethyl vinyl acetate) (EVA) was dissolved in xylenes and was mixed with 1 wt % calcium silicate using a speedmixer for 5 minutes at 3000 rpm. The resulting mixtures were dried at 50° C. in under reduced pressure (29 inches of Hg in vacuum) and pressed a carver press at 100° C. and 1 MPa to form 0.5 mm thick films. The films were then placed in a $CO_2$ environment at 14 MPa at 34° C. for 3 hours. Then, the pressure was rapidly reduced at a rate of 5 MPa/s and the composition was allowed to foam at 34° C. and ambient pressure. A control EVA foam was also prepared using the same method, except that no calcium silicate was added. The foams were cryofractured and characterized using a HITACHI S-4300SE/N scanning electron microscope (SEM). SEM micrographs of the control EVA foam and the calcium silicate-nucleated EVA foam are shown in FIG. 3. The average cell diameter was determined as described in Example 1.

Figure 4:
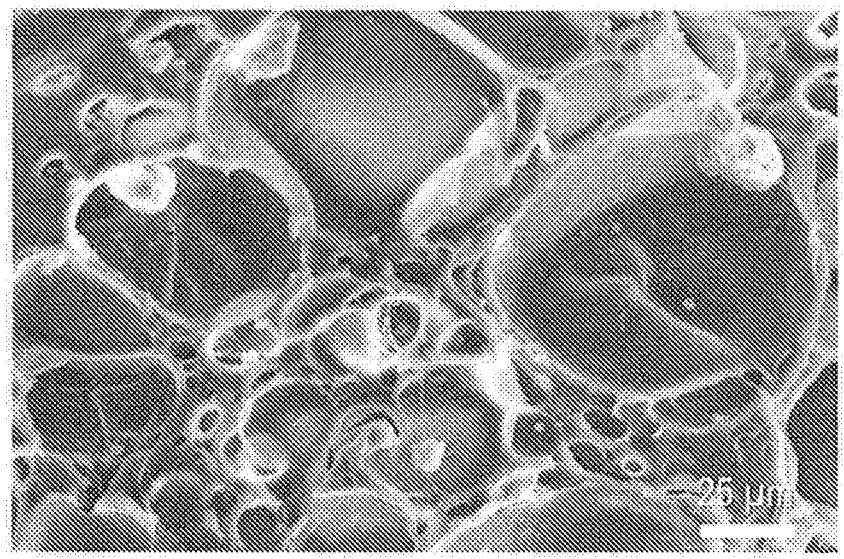
FIG. 4 shows a scanning electron microscope (SEM) image of an exemplary EVA polymer foam.

As shown in FIG. 3, the addition of calcium silicate as a nucleating agent reduces the average cell size of the EVA foam. For the control EVA foam, the average cell diameter was 108 µm. The addition of 1 wt % calcium silicate as a nucleating agent reduced the average cell diameter by about 79% to 23 µm. FIG. 4 shows a further magnified image of the calcium silicate-nucleated EVA foam, which shows a correlation between the foam cell diameter and the diameter of the calcium silicate particle within the cell. As shown in FIG. 4, the alkaline earth metal silicate may be seen in a cell of the polymer-based foam matrix. FIGS. 8-11 also show SEM images of alkaline earth metal silicates used to nucleate cells in polymer foams, where the nucleating agent can be seen within the cell of the foam. Without wishing to be bound by a particular theory, it is believed that this correlation between cell size and particle size relates directly to the nucleation mechanism. Under such conditions, the $CO_2$ favorably interacts with the surface of the calcium silicate to facilitate the formation of a bubble and the amount of gas available for foaming will scale with the available surface area of the nucleating silicate. As a result, increasing particle size may result in an increase in the bubble size of the foam. This correlation may indicate that bubble nucleation is facilitated through the favorable interaction of a gas with the calcium silicate surface.

Example 3

Tests and analytical results of unfilled and filled polyethylene terephthalate foams were prepared via a two-step extrusion-mixing and foaming process.

All materials were prepared by melt-mixing polyethylene terephthalate resin "PQB15-089", commercially available from PolyQuest, Inc., with different nucleating agent using a Haake Rheomex PTW16 co-rotating twin-screw extruder. Table 1 shows the extrusion temperature profiles. The screw speeds were 250 rpm in this example.

TABLE 1

| Extrusion parameters | Temperature (° C.) |
| --- | --- |
| T1 (throat) | 250 |
| T2 | 250 |
| T3 | 290 |
| T4 | 290 |
| T5 | 290 |
| T6 | 290 |
| T7 | 290 |
| T8 | 290 |
| T9 | 290 |
| T10 (die) | 290 |

Several minerals were tested as nucleating agents for polymer foams, which are shown below in Table 2, along with the $d_{50}$ and BET surface area values of each mineral. The do and BET surface area is measured as described above.

TABLE 2

| Sample | Mineral | $D_{50}$ (µm) | BET (m$^2$/g) |
| --- | --- | --- | --- |
| Sample A | Natural Calcium Silicate | 6.50 | 3.5 |
| Sample B | Chloritic Talc | 13.44 | 4.6 |
| Sample C | Synthetic Calcium Silicate | 7.58 | 95 |
| Sample D | Synthetic Magnesium Silicate | 11.29 | 200 |

Each of samples A-D was added by mechanically mixing 1 wt % of mineral with polyethylene terephthalate ("PET"), then processing the composition inside a twin-screw extruder. For comparison purposes, a control material of PET without any mineral was also processed using identical processing conditions. At the exit of a circular extrusion die, all composites were cooled using a water bath at 25° C. and pelletized prior to solid foaming precursor preparation.

The composition of each PET-mineral composite was determined by calcination as the average of three values obtained according to UNE-EN ISO345-1 using 5.0 g of each sample material at 600° C. Table 3 below shows that composition of each sample.

TABLE 3

| Sample | Composite | Mineral content (wt %) |
| --- | --- | --- |
| Sample A | PET + Natural Calcium Silicate | 0.75 |
| Sample B | PET + Chloritic Talc | 0.81 |
| Sample C | PET + Synthetic Calcium Silicate | 0.66 |
| Sample D | PET + Synthetic Magnesium Silicate | 0.71 |

To prepare solid precursors for foaming, each of pelletized samples A-D were formed into a disk having a diameter of 34.5 mm and a thickness of 1.7 mm using a Haake MiniJet Pro piston injection molder system. The molding conditions are shown below in Table 4.

TABLE 4

| Cylinder Temperature (° C.) | Mold Temperature (° C.) | Injection Pressure (psi) | Injection Time (s) |
| --- | --- | --- | --- |
| 285 | 50 | 700 | 3 |

Foaming was performed using either carbon dioxide ($CO_2$) or nitrogen ($N_2$) gas dissolution.

For the $CO_2$ dissolution, the solid foaming precursor discs were foamed using a two-step gas dissolution batch-foaming process with $CO_2$ as the physical blowing agent. Foams were obtained by saturating the discs in $CO_2$ in a high-pressure vessel at 20° C. at 7.5 MPa for 72 hours until the discs contained 6 wt. % dissolved $CO_2$. The pressure was then released at a rate of 5 MPa/s. The saturated discs were then transferred to a Carver hot press and foamed at 150° C. for one minute.

For the $N_2$ dissolution, the solid foaming precursor discs were foamed using a two-step gas dissolution batch-foaming process with $N_2$ as the physical blowing agent. Foams were obtained by saturating the discs in $N_2$ in a high-pressure vessel at 20° C. at 17.5 MPa for 112 hours until the discs contained 0.2 wt % dissolved $N_2$. The pressure was then released at a rate of 5 MPa/s. The saturated discs were then transferred to a Carver hot press and foamed at 150° C. for 1 minute.

The foamed and unfoamed composites were then characterized. The densities were measured according to ISO 845, without removing the outer skins of the foamed specimens generated during the $CO_2$-foaming and $N_2$-foaming process. The relative density was also determined and refers to the ratio of the density between the foamed and unfoamed composites. The cellular structure of the various foams was studied using a HITACHI S-4300SE/N scanning electron microscope (SEM) from samples cryogenically fractured using liquid nitrogen and made conductive by sputter deposition of a thin layer of gold. The average cell diameter ($\varphi$) and cell density ($N_f$) were directly obtained from low-magnification micrographs using the intercept counting method described above.

Figure 5:
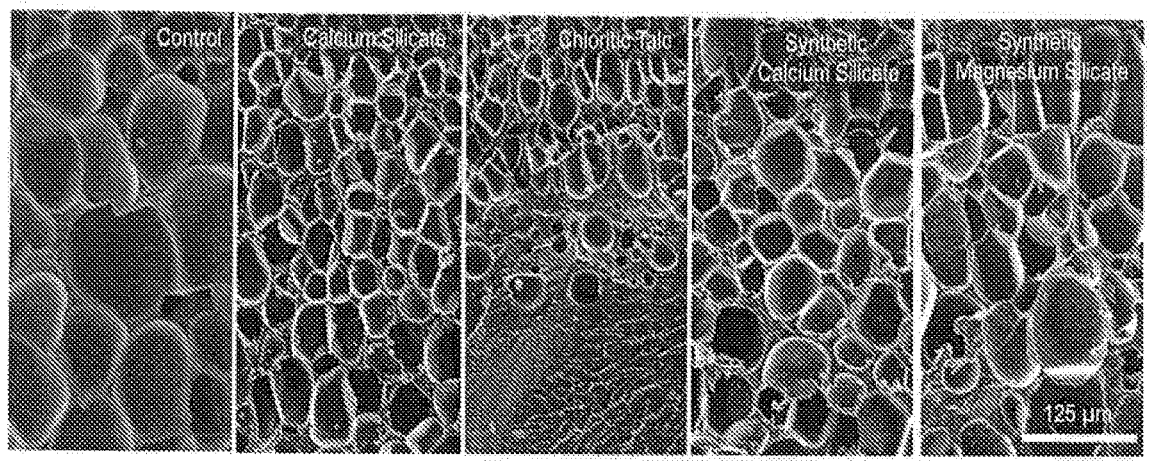
FIGS. 5 and 6 show scanning electron microscope (SEM) images of exemplary polyethylene terephthalate (PET) polymer foams.

The results of the $CO_2$-foaming are shown below in Table 5. SEM images of the $CO_2$-foamed Samples A-D are shown in FIG. 5 for the center and FIG. 6 for the skin layer.

TABLE 5

| Sample | | Unfoamed density (g/cm³) | Foamed density (g/cm³) | Relative density | $\varphi$ ($\mu$m) | $N_f$ (cells/cm³) |
|---|---|---|---|---|---|---|
| Control | Center | 1.339 | 0.365 | 0.272 | 79.6 | $5.29 \times 10^6$ |
| | Skin | | | | 10.8 | $2.83 \times 10^7$ |
| A | Center | 1.345 | 0.374 | 0.278 | 34.3 | $4.32 \times 10^7$ |
| | Skin | | | | 6.6 | $1.93 \times 10^9$ |
| B | Center | 1.352 | 0.753 | 0.557 | 25.6 | $8.08 \times 10^6$ |
| | Skin | | | | 6.9 | $3.10 \times 10^8$ |
| C | Center | 1.330 | 0.315 | 0.227 | 29.9 | $6.68 \times 10^7$ |
| | Skin | | | | 6.2 | $1.27 \times 10^9$ |
| D | Center | 1.327 | 0.666 | 0.501 | 34.5 | $1.92 \times 10^7$ |
| | Skin | | | | 6.8 | $4.59 \times 10^8$ |

Figure 7:
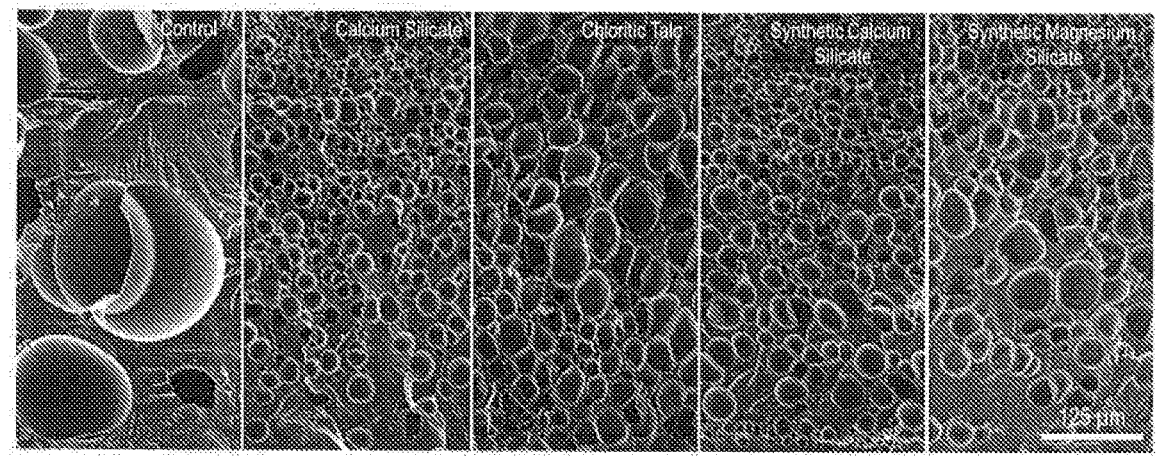
FIG. 7 shows a scanning electron microscope (SEM) image of exemplary PET polymer foams.
Figure 8:
FIGS. 8-11 show scanning electron microscope (SEM) images of exemplary polyethylene terephthalate (PET) polymer foams.
Figure 9:
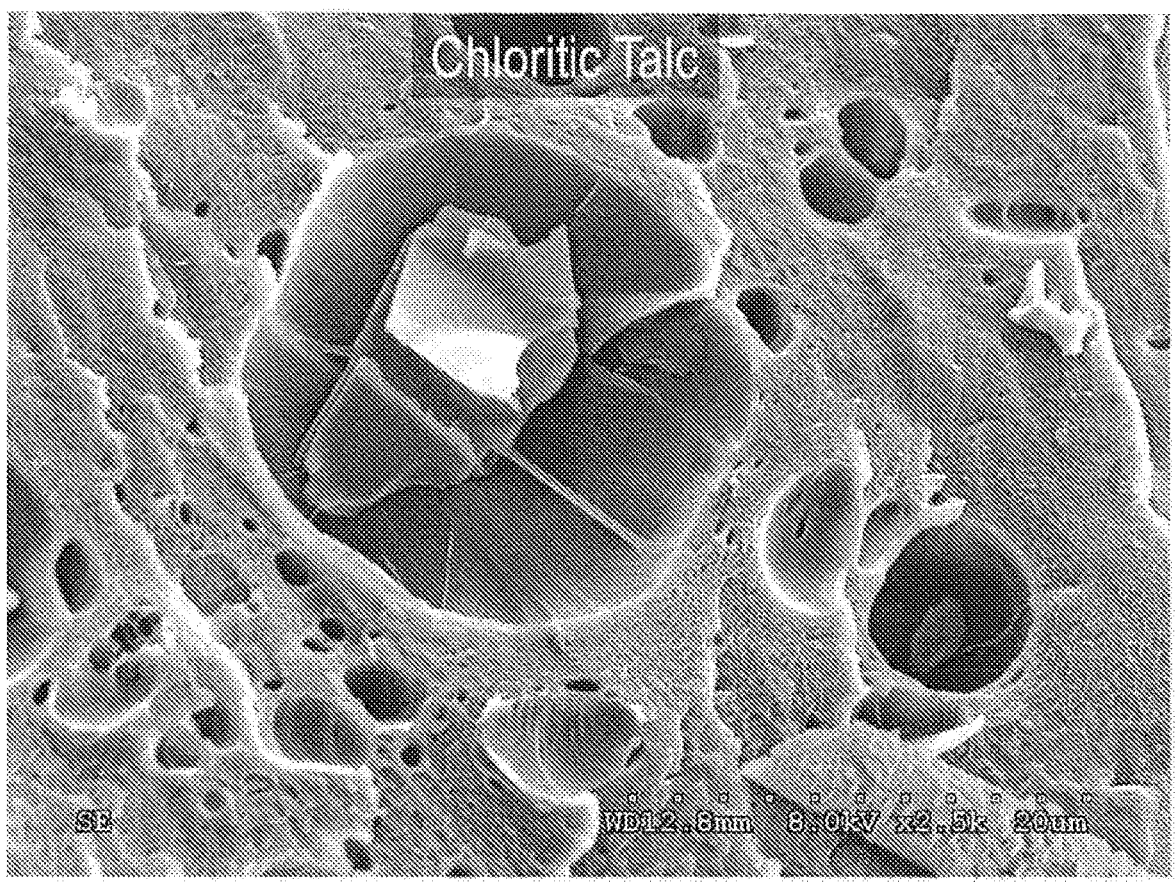
Figure 10:
Figure 11:
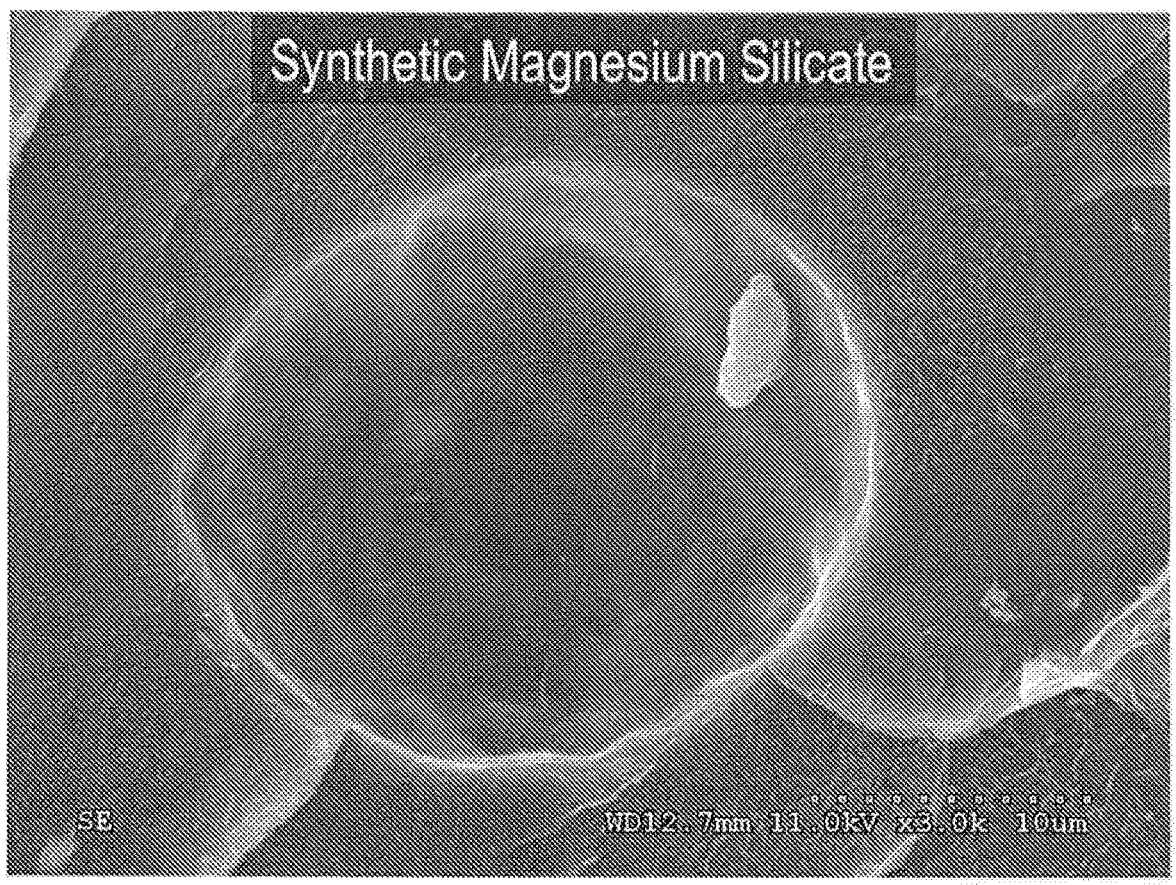

The results of the $N_2$-foaming are shown below in Table 6. SEM images of the $N_2$-foamed Samples A-D are shown in FIG. 7.

TABLE 6

| Sample | Unfoamed density (g/cm³) | Foamed density (g/cm³) | Relative density | $\varphi$ ($\mu$m) | $N_f$ (cells/cm³) |
|---|---|---|---|---|---|
| Control | 1.339 | 0.743 | 0.555 | | |
| A | 1.345 | 0.865 | 0.643 | 19.0 | $2.79 \times 10^7$ |
| B | 1.351 | 0.982 | 0.727 | 20.9 | $4.02 \times 10^6$ |
| C | 1.337 | 0.811 | 0.607 | 17.1 | $4.55 \times 10^7$ |
| D | 1.345 | 0.889 | 0.661 | 33.5 | $7.99 \times 10^6$ |

Figure 6:
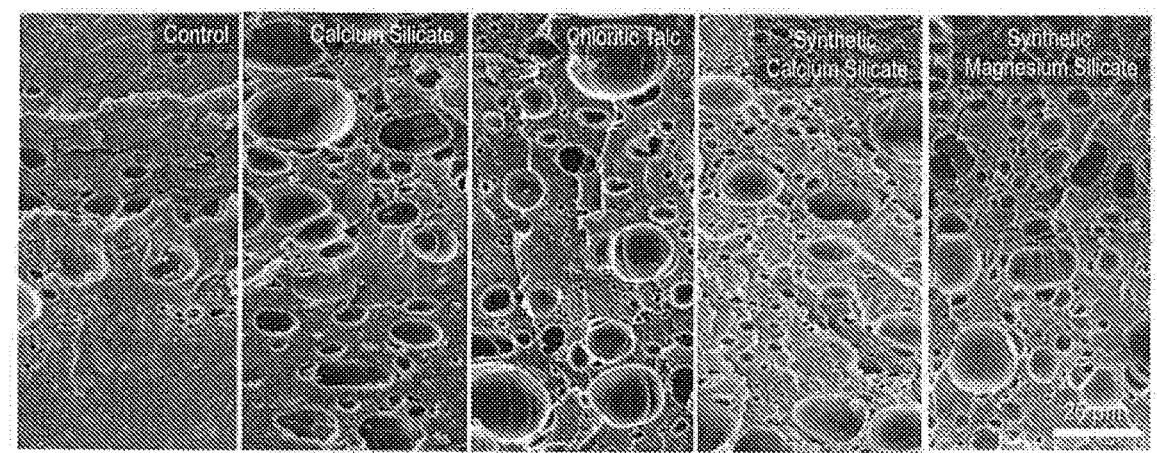

As shown in Tables 5 and 6 above and FIGS. 5 and 6, alkaline earth metal silicates, such as calcium silicate and magnesium silicate, may provide efficient nucleating agents in $CO_2$ and $N_2$ environments. In the $N_2$ environment, calcium silicate (such as, for example, Wollastonite) may provide an efficient agent to reduce the cell (bubble) size, which may improve the mechanical strength of the foamed composites.

Example 4

Tests and analytical results of unfilled and filled polypropylene foams prepared according to an extrusion-mixing and injection-moulding foaming process are described in this example.

The production of foamed polypropylene was carried out using a chemical blowing additive during injection-moulding. Polypropylene block copolymer "PP56M10" (MFI of 6.2 g/10 min; 230° C., 2.16 kg), commercially available from Sabic, was foamed using Hydrocerol ITP 818 (65% active content of a blend of citric acid and sodium bicarbonate), which is commercially available from Clariant (2 wt %) as the chemical blowing agent, to obtain ISO B bars of dimensions 80 cm×10 cm×4 mm. The mineral compositions incorporated were (i) talc, (ii) Wollastonite, (iii) a 50:50 blend by weight of talc and a Wollastonite, all present at a concentration of 20 wt % based on the total weight of the filled polymer. The injection-moulding machine "Arburg Allrounder 420C" has a closing force of 100 tons, maximum injection pressure of 2000 bar, and a screw diameter of 35 mm. The temperatures of the injection unit are shown in Table 7. The mould temperature was set to 40° C. for solid and 60° C. for foam with an in-mould cooling time of respectively 15 and 30 seconds. The talc used in this example was a blend of two talcs A and B. Talc A possessed a $d_{50}$ of 10.5 $\mu$m (laser) and 2 $\mu$m (Sedigraph) plus a BET surface area of 19.5 m²/g. Talc B possessed a $d_{50}$ of 5.7 $\mu$m (laser) and 1.1 $\mu$m (Sedigraph) plus a BET surface area of 21 m²/g. The Wollastonite possessed a $d_{50}$ of 7 $\mu$m (laser) and a BET surface area of 2.9 m²/g.

TABLE 7

| Injection unit temperatures | |
|---|---|
| Zone | Temperature (° C.) |
| 1 | 200 |
| 2 | 210 |
| 3 | 220 |
| 4 | 225 |
| 5 (die) | 230 |

Foams were produced using the above described process. The polymer dosages and injection speeds for solid and foamed conditions are shown in Table 8.

TABLE 8

| Polymer dosages and injection speeds for each condition | | | |
|---|---|---|---|
| Condition | Final weight reduction (%) | Polymer dosage (cm³) | Polymer injection speed (cm³/s) |
| Solid | — | 37 | 30 (26 cm³)-130 (7 cm³) |
| Foam | 17-18 | 37 | 83 (23 cm³)-220 (11.5 cm³) |

The various foams produced from the polypropylene comprising talc and Wollastonite and their unfoamed equivalents had the densities shown in Table 9. The densities were measured according to ISO 1183.

TABLE 9

| Densities of unfoamed and foamed polypropylene compounds | | | | |
|---|---|---|---|---|
| Material | Foam code | Density (g·cm⁻³) | Relative density | Weight reduction (%) |
| 20% Talc | Solid | 1.039 | — | — |
| | Foam | 0.861 | 0.83 | 17 |
| 20% Wollastonite | Solid | 1.032 | — | — |
| | Foam | 0.853 | 0.83 | 17 |
| 20% 50/50 blend talc/wollastonite | Solid | 1.038 | — | — |
| | Foam | 0.850 | 0.82 | 18 |

The flexural modulus was analysed on the injection molded ISO bars according to the three points bending test at 23° C. following ISO 178 standards.

The foams produced according to the injection molding foaming process were analysed by the three points bending test characterisation as described above. The results are shown in Table 10.

TABLE 10

Three points bending test characterisation of the polypropylene-mineral foams produced according to the injection moulding foaming process

| Samples | Solid/foam | Flexural Modulus (MPa) |
|---|---|---|
| 20% Talc | Solid | 3012 |
| | Foam | 2385 |
| 20% Wollastonite | Solid | 3039 |
| | Foam | 2577 |
| 20% 50/50 blend talc/wollastonite | Solid | 3185 |
| | Foam | 2639 |

The data shows a blend of talc and Wollastonite shows improved results compared to each product alone, indicating evidence of a synergistic effect.

For the avoidance of doubt, the present application extends to the subject-matter in the following numbered paragraphs 1 to 52.
1. A method of producing a polymer foam, the method comprising:
    a. providing a polymer composition;
    b. introducing an alkaline earth metal silicate into the polymer composition; and
    c. foaming the polymer composition using a gas to form a polymer foam,
2. The method according to numbered paragraph 1, wherein the introducing the alkaline earth metal silicate comprises introducing the alkaline earth metal silicate into the polymer composition using an extrusion-mixing process.
3. The method according to numbered paragraph 1 or 2, wherein the polymer composition comprises at least one of a thermoplastic polymer or a thermoplastic elastomer.
4. The method according to any one of numbered paragraphs 1 to 3, wherein the polymer composition comprises at least one of polystyrene, polypropylene, polyurethane, poly(ethyl vinyl acetate) (EVA), polyethylene terephthalate (PET), or copolymers thereof.
5. The method according to any one of numbered paragraphs 1 to 4, wherein the gas comprises at least one of $CO_2$, $N_2$, or an organic gas or wherein the gas is from a blowing agent comprising at least one of $CO_2$, $N_2$, or an organic gas.
6. The method according to any one of numbered paragraphs 1 to 5, wherein the polymer composition is the major component of the polymer foam.
7. The method according to any one of numbered paragraphs 1 to 6, wherein alkaline earth metal silicate comprises at least one of calcium silicate or magnesium silicate.
8. The method according to any one of numbered paragraphs 1 to 7, wherein the polymer foam has an average cell size ($\varphi$) less than or equal to about 450 μm.
9. The method according to any one of numbered paragraphs 1 to 8, wherein the polymer foam has a cell density ($N_f$) greater than or equal to about $3.0 \times 10^7$ per $cm^3$.
10. The method according to any one of numbered paragraphs 1 to 9, wherein the alkaline earth metal silicate has a BET surface area greater than or equal to about 3.0 $m^2/g$.
11. The method according to any one of numbered paragraphs 1 to 10, wherein the alkaline earth metal silicate has a median particle size ($d_{50}$) greater than or equal to about 1 μm.
12. The method according to any one of numbered paragraphs 1 to 11, wherein the alkaline earth metal silicate has a median particle size ($d_{50}$) in a range from about 1 μm to about 50 μm.
13. The method according to any one of numbered paragraphs 1 to 12, wherein the method comprises a two-step extrusion-mixing and foaming process.
14. The method according to any one of numbered paragraphs 1 to 13, wherein the method comprises a single-step injection-moulding foaming process.
15. The method according to any one of numbered paragraphs 1 to 14, wherein the alkaline earth metal silicate comprises a diatomaceous earth-derived calcium silicate.
16. The method according to any one of numbered paragraphs 1 to 15, wherein the alkaline earth metal silicate comprises Wollastonite.
17. The method according to any one of numbered paragraphs 1 to 16, wherein the alkaline earth metal silicate has an oil absorption greater than or equal to about 300 wt %.
18. The method according to any one of numbered paragraphs 1 to 17, wherein the alkaline earth metal silicate has a water absorption greater than or equal to about 400 wt %.
19. The method according to any one of numbered paragraphs 1 to 18, wherein the alkaline earth metal silicate has an aspect ratio in the range of from about 1 to about 50.
20. The method according to any one of numbered paragraphs 1 to 19, wherein the alkaline earth metal silicate further comprises a secondary mineral.
21. The method according to numbered paragraph 20, wherein the secondary mineral is selected from magnesium oxysulfate a kaolin, a bentonite, a talc, a chloritic talc, a milled expanded perlite, and a diatomaceous earth.
22. A polymer foam composition comprising:
    a. a polymer-based foam matrix; and
    b. an mineral nucleating agent within a cell of the polymer-based foam matrix.
23. The polymer foam composition according to numbered paragraph 22, wherein the mineral nucleating agent comprises an alkaline earth metal silicate.
24. The polymer foam composition according to numbered paragraph 22, wherein the mineral nucleating agent comprises at least one of magnesium oxysulfate, kaolin, talc, chloritic talc, perlite, expanded milled perlite, diatomaceous earth, glass cullet, feldspar, nepheline syenite, and bentonite.
25. The polymer foam composition according to any one of numbered paragraphs 22 to 24, wherein the polymer-based foam matrix comprises at least one of a thermoplastic polymer matrix or a thermoplastic elastomer matrix.
26. The polymer foam composition according to any one of numbered paragraphs 22 to 25, wherein the polymer-based foam matrix comprises at least one of a polystyrene matrix, polypropylene matrix, polyurethane matrix, poly(ethyl vinyl acetate) (EVA) matrix, polyethylene terephthalate (PET) matrix, or copolymer matrices thereof.

27. The polymer foam composition according to any one of numbered paragraphs 22 to 26, wherein a blowing agent used to form the polymer-based foam matrix comprises at least one of $CO_2$, $N_2$, or an organic gas.

28. The polymer foam composition according to any one of numbered paragraphs 22 to 27, wherein the polymer-based foam matrix composition is the major component of the polymer foam.

29. The polymer foam composition according to any one of numbered paragraphs 23 to 28, wherein alkaline earth metal silicate comprises at least one of calcium silicate or magnesium silicate.

30. The polymer foam composition according to numbered paragraph 29, wherein the calcium silicate is a natural calcium silicate, for example Wollastonite.

31. The polymer foam composition according to any one of numbered paragraphs 22 to 30, wherein the polymer foam has an average cell size ($\varphi$) less than or equal to about 450 μm.

32. The polymer foam composition according to any one of numbered paragraphs 22 to 31, wherein the polymer foam has a cell density ($N_f$) greater than or equal to about $3.0 \times 10^7$ per cm$^3$.

33. The polymer foam composition according to any one of numbered paragraphs 22 to 32, wherein the mineral nucleating agent has a BET surface area greater than or equal to about 3.0 m$^2$/g.

34. The polymer foam composition according to any one of numbered paragraphs 22 to 33, wherein the mineral nucleating agent has a median particle size ($d_{50}$) greater than or equal to about 1 μm.

35. The polymer foam composition according to any one of numbered paragraphs 22 to 34, wherein the mineral nucleating agent has a median particle size ($d_{50}$) in a range from about 1 μm to about 50 μm.

36. The polymer foam composition according to any one of numbered paragraphs 22 to 35, wherein the mineral nucleating agent has an oil absorption greater than or equal to about 300 wt %.

37. The polymer foam composition according to any one of numbered paragraphs 22 to 36, wherein the mineral nucleating agent has a water absorption greater than or equal to about 400 wt %.

38. The polymer foam composition according to any one of numbered paragraphs 22 to 37, wherein the mineral nucleating agent has an aspect ratio in the range of from about 1 to about 50.

39. The polymer foam composition according to any one of numbered paragraphs 22 to 38, wherein the mineral nucleating agent further comprises a secondary mineral nucleating agent.

40. The polymer foam composition according to numbered paragraph 39, wherein the secondary mineral nucleating agent is selected from magnesium oxysulfate a kaolin, a bentonite, a talc, a chloritic talc, a milled expanded perlite, and a diatomaceous earth.

41. The polymer foam composition according to any one of numbered paragraphs 22 to 40, wherein the mineral nucleating agent comprises a blend of talc and chloritic talc.

42. The polymer foam composition according to numbered paragraph 41, wherein the polymer foam composition has a first flexural modulus, the first flexural modulus being greater than a flexural modulus of a comparative polymer foam composition having a mineral nucleating agent comprising one of talc or chloritic talc individually.

43. The polymer foam composition according to any one of numbered paragraphs 22 to 42, wherein the mineral nucleating agent comprises at least one of a lamellar talc, micro-lamellar talc, microcrystalline talc, and macrocrystalline talc.

44. The polymer foam composition according to any one of numbered paragraphs 22 to 43, wherein the mineral nucleating agent has a lamellarity index greater than about 2.8.

45. The polymer foam composition according to any one of numbered paragraphs 22 to 44, wherein the polymer-based foam matrix comprises a polyolefin.

46. A method of producing a polymer-matrix, the method comprising:
    a. providing a polymer composition;
    b. nucleating the polymer composition with an alkaline earth metal silicate;
    c. using a blowing agent to form a polymer foam from the polymer composition,
    d. wherein the alkaline earth metal silicate facilitates nucleation of the cells in the polymer foam.

47. A polymer foam composition comprising:
    a. a polymer-based foam matrix; and
    b. a mineral nucleating agent within a cell of the polymer-based foam matrix, the mineral nucleating agent comprising talc and chloritic talc.

48. The polymer foam composition according to numbered paragraph 47, wherein the polymer foam composition has a first flexural modulus, the first flexural modulus being greater than a flexural modulus of a comparative polymer foam composition having a mineral nucleating agent comprising one of talc or chloritic talc individually.

49. The polymer foam composition according to numbered paragraph 47 or 48, wherein the mineral nucleating agent comprises at least one of a lamellar talc, micro-lamellar talc, microcrystalline talc, and macrocrystalline talc.

50. The polymer foam composition according to any one of numbered paragraphs 47 to 49, wherein the mineral nucleating agent has a lamellarity index greater than about 2.8.

51. The polymer foam composition according to any one of numbered paragraphs 47 to 50, wherein the polymer-based foam matrix comprises a polyolefin.

52. An injection molded automotive component comprising the polymer foam composition of any one of numbered paragraphs 47 to 51.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A polymer foam composition comprising:
   a polymer-based foam matrix; and
   a mineral nucleating agent within a cell of the polymer-based foam matrix; wherein the mineral nucleating agent has a water absorption greater than or equal to about 400 wt %.

2. The polymer foam composition according to claim 1, wherein the mineral nucleating agent has an aspect ratio in the range of from about 1 to about 50.

3. The polymer foam composition according to claim 1, wherein the mineral nucleating agent further comprises a secondary mineral nucleating agent.

4. The polymer foam composition according to claim 3, wherein the secondary mineral nucleating agent is selected from magnesium oxysulfate a kaolin, a bentonite, a talc, a chloritic talc, a milled expanded perlite, and a diatomaceous earth.

5. The polymer foam composition according to claim 1, wherein the mineral nucleating agent further comprises a blend of talc and chloritic talc.

6. The polymer foam composition according to claim 5, wherein the polymer foam composition has a first flexural modulus, the first flexural modulus being greater than a flexural modulus of a comparative polymer foam composition having a mineral nucleating agent comprising one of talc or chloritic talc individually.

7. The polymer foam composition according to claim 1, wherein the mineral nucleating agent further comprises at least one of a lamellar talc, micro-lamellar talc, microcrystalline talc, and macrocrystalline talc.

8. The polymer foam composition according to claim 1, wherein the mineral nucleating agent has a lamellarity index greater than about 2.8.

9. The polymer foam composition according to claim 1, wherein the polymer-based foam matrix further comprises a polyolefin.

10. The polymer foam composition according to claim 1, wherein the mineral nucleating agent comprises an alkaline earth metal silicate.

11. The polymer foam composition according to claim 1, wherein the polymer foam has an average cell size ($\varphi$) less than or equal to about 450 μm.

12. The polymer foam composition according to claim 1, wherein the polymer foam has a cell density ($N_f$) greater than or equal to about $3.0 \times 10^7$ per $cm^3$.

13. The polymer foam composition according to claim 1, wherein the mineral nucleating agent has a BET surface area greater than or equal to about 3.0 $m^2/g$.

14. The polymer foam composition according to claim 1, wherein the mineral nucleating agent has a median particle size ($d_{50}$) greater than or equal to about 1 μm.

* * * * *